United States Patent
Lee et al.

(10) Patent No.: US 10,347,938 B2
(45) Date of Patent: Jul. 9, 2019

(54) ELECTROLYTE COMPOSITE AND NEGATIVE ELECTRODE AND LITHIUM SECOND BATTERY INCLUDING THE ELECTROLYTE COMPOSITE

(71) Applicants: Samsung Electronics Co., Ltd., Suwon-si, Gyeonggi-do (KR); MIE UNIVERSITY, Tsu-shi, Mie (JP)

(72) Inventors: Yonggun Lee, Incheon (KR); Nobuyuki Imanishi, Tsu (JP); Osamu Yamamoto, Tsu (JP); Hyorang Kang, Anyang-si (KR)

(73) Assignee: SAMSUNG ELECTRONICS CO., LTD, Gyeonggi-Do (KR)

(*) Notice: Subject to any disclaimer, the term of this patent is extended or adjusted under 35 U.S.C. 154(b) by 487 days.

(21) Appl. No.: 14/937,404

(22) Filed: Nov. 10, 2015

(65) Prior Publication Data

US 2016/0336618 A1 Nov. 17, 2016

(30) Foreign Application Priority Data

May 12, 2015 (KR) .................. 10-2015-0066252

(51) Int. Cl.
 *H01M 4/134* (2010.01)
 *H01M 4/38* (2006.01)
 (Continued)

(52) U.S. Cl.
 CPC ... *H01M 10/0565* (2013.01); *H01M 10/0525* (2013.01); *H01M 4/134* (2013.01);
 (Continued)

(58) Field of Classification Search
 CPC ... H01M 10/0565; H01M 4/134; H01M 4/382
 See application file for complete search history.

(56) References Cited

U.S. PATENT DOCUMENTS 6,030,909 A * 2/2000 Fu .................. C03C 4/18
 204/424
6,200,707 B1 * 3/2001 Takada .............. H01M 4/621
 429/212

(Continued)

FOREIGN PATENT DOCUMENTS

KR 1020110003131 A 1/2011
KR 1020110122472 A 11/2011

(Continued)

OTHER PUBLICATIONS

C. Serre et al. "Role of Solvent-Host Interactions That Lead to Very Large Swelling of Hybrid Frameworks" Science 315, 1828 (2007).

(Continued)

*Primary Examiner* — Jonathan G Jelsma
(74) *Attorney, Agent, or Firm* — Cantor Colburn LLP

(57) ABSTRACT

An electrolyte composite including a first block copolymer and a lithium ion conductor, wherein the first block copolymer includes i) a structural domain and ii) at least one of a rubbery domain and an ion conductive domain, wherein the structural domain includes a polymer segment including a structural repeating unit, wherein the rubbery domain includes a polymer segment including a rubbery repeating unit, and wherein the ion conductive domain includes a polymer segment including an ion conductive repeating unit.

19 Claims, 7 Drawing Sheets

(51) Int. Cl.
*H01M 10/0565* (2010.01)
*H01M 10/0525* (2010.01)
*H01M 4/02* (2006.01)
*H01M 4/36* (2006.01)

(52) U.S. Cl.
CPC ............ *H01M 4/366* (2013.01); *H01M 4/382* (2013.01); *H01M 2004/027* (2013.01); *H01M 2220/20* (2013.01); *H01M 2300/0082* (2013.01); *Y02E 60/122* (2013.01)

(56) References Cited

U.S. PATENT DOCUMENTS

| | | | |
|---|---|---|---|
| 6,361,901 B1* | 3/2002 | Mayes | H01M 4/13 429/188 |
| 7,070,632 B1* | 7/2006 | Visco | H01M 2/1686 29/623.3 |
| 8,552,144 B2 | 10/2013 | Javier et al. | |
| 9,105,940 B2 | 8/2015 | Lee et al. | |
| 2009/0075176 A1* | 3/2009 | Singh | H01B 1/122 429/309 |
| 2009/0104523 A1* | 4/2009 | Mullin | C08F 297/02 429/188 |
| 2010/0226991 A1 | 9/2010 | Horcajada-Cortes et al. | |
| 2011/0003210 A1 | 1/2011 | Lim et al. | |
| 2011/0003211 A1* | 1/2011 | Hudson | H01M 4/13 429/304 |
| 2011/0138999 A1 | 6/2011 | Willis | |
| 2013/0084501 A1* | 4/2013 | Wakayama | H01M 4/1397 429/231.8 |
| 2014/0342222 A1* | 11/2014 | Kim | H01M 4/366 429/213 |
| 2016/0294005 A1 | 10/2016 | Lee et al. | |

FOREIGN PATENT DOCUMENTS

| | | |
|---|---|---|
| KR | 1020120031738 A | 4/2012 |
| KR | 1020130099706 A | 9/2013 |

OTHER PUBLICATIONS

Peng Zhang et al. "Water-stable lithium ion conducting solid electrolyte of the Li1.4Al0.4Ti1.6-xGex(PO4) system (x =0-1.0) with NASICON-type structure" Solid State Ionics 253 (2013) 175-180.

* cited by examiner

ELECTROLYTE COMPOSITE AND NEGATIVE ELECTRODE AND LITHIUM SECOND BATTERY INCLUDING THE ELECTROLYTE COMPOSITE

CROSS-REFERENCE TO RELATED APPLICATION

This application claims priority to and the benefit of Korean Patent Application No. 10-2015-0066252, filed on May 12, 2015, in the Korean Intellectual Property Office, the content of which is incorporated herein in its entirety by reference.

BACKGROUND

1. Field

The present disclosure relates to an electrolyte composite and a negative electrode and a lithium secondary battery that include the electrolyte composite.

2. Description of the Related Art

Lithium secondary batteries are high-performance batteries having the highest energy density among other currently available secondary batteries, and which are applicable in various fields such as electric vehicles.

A lithium secondary battery may use a lithium metal thin film as a negative electrode. When a lithium metal thin film is used as the negative electrode, it may react with a liquid electrolyte during charging or discharging due to the high reactivity of lithium, or it may lead to a growth of dendritic formations on the lithium metal thin film (i.e., the negative electrode). Accordingly, a lithium secondary battery including such a lithium metal thin film may have reduced lifespan and stability. Therefore, there is a need for improved lithium electrode.

SUMMARY

Provided is an electrolyte composite having good interfacial characteristics with lithium metals and improved ion conductivity and mechanical properties.

Provided is a negative electrode for a lithium secondary battery using the electrolyte composite as a protective layer for a lithium metal electrode.

Provided is a lithium secondary battery having improved cell performance due to inclusion of the negative electrode.

Additional aspects will be set forth in part in the description which follows and, in part, will be apparent from the description, or may be learned by practice of the presented exemplary embodiments.

According to an aspect of an exemplary embodiment, an electrolyte composite includes:
a first block copolymer and
a lithium ion conductor,
wherein the first block copolymer includes
i) a structural domain and
ii) at least one of a rubbery domain or an ion conductive domain, wherein the structural domain includes a polymer segment having a structural repeating unit,
wherein the rubbery domain includes a polymer segment having a rubbery repeating unit, and
wherein the ion conductive domain includes a polymer segment having an ion conductive repeating unit.

The lithium ion conductor may include an inorganic compound having ion conductivity of about $1 \times 10^{-4}$ Siemens per centimeter or greater.

The electrolyte composite may have a structure in which a plurality of particles of the lithium ion conductor is embedded in a matrix that is formed of the first block copolymer.

The electrolyte composite may have a core-shell structure in which the core includes the lithium ion conductor and the shell includes the first block copolymer.

A surface of the lithium ion conductor may be covalently bound to a second block copolymer that is homogeneous or heterogeneous with the first block copolymer.

According to an aspect of another exemplary embodiment, a negative electrode for a lithium secondary battery includes
a substrate including a lithium metal or a lithium metal alloy; and
a protective layer disposed on at least one portion of the substrate,
wherein the protective layer includes the electrolyte composite.

According to an aspect of another exemplary embodiment, a lithium secondary battery includes:
a positive electrode;
a negative electrode; and
a protective layer disposed between the positive electrode and the negative electrode,
wherein the protective layer includes the electrolyte composite.

The negative electrode may be a lithium metal electrode or a lithium metal alloy electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
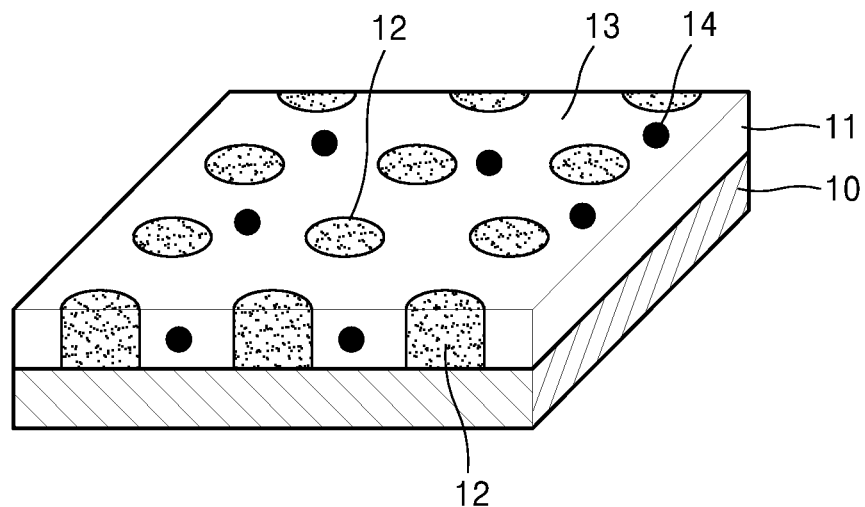
FIG. 1 is a schematic view illustrating a structure of a negative electrode for a lithium secondary battery, wherein the negative electrode includes an electrolyte composite on a lithium metal substrate.

Reference will now be made in detail to exemplary embodiments of an electrolyte composite, a negative electrode for a lithium secondary battery including the electrolyte composite, and a lithium secondary battery including the electrolyte composite, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an exemplary embodiment, an electrolyte composite may include:
a first block copolymer; and a lithium ion conductor,
wherein the first block copolymer may include:
i) a structural domain and
ii) at least one of a rubbery domain or an ion conductive domain.

The structural domain may include a polymer segment having a structural repeating unit, the rubbery domain may include a polymer segment having a rubbery repeating unit, and the ion conductive domain may include a polymer segment having ion conductive repeating unit.

The lithium ion conductor may include an inorganic compound having an ion conductivity of at least $1 \times 10^{-4}$ Siemens per centimeter (S/cm), e.g., $4 \times 10^{-4}$ S/cm, $6 \times 10^{-4}$ S/cm, $8 \times 10^{-4}$ S/cm, or $1 \times 10^{-3}$ S/cm, at a temperature of 25° C. The lithium ion conductor will be described in detail below.

In the electrolyte composite, the lithium ion conductor having such a high ion conductivity may be embedded in the first block copolymer or may be coated with the first block copolymer.

In an exemplary embodiment, the electrolyte composite may have a structure in which a plurality of particles of the lithium ion conductor is embedded in a matrix that is formed of the first block copolymer. The matrix formed of the first block copolymer may have a structure in which the structural domain has a cylindrical phase and is included in a base formed of at least one of the rubbery domain or the ion conductive domain, and wherein the lithium ion conductor may be embedded in the base.

FIG. 1 is a schematic view illustrating a structure of negative electrode for a lithium secondary battery, the negative electrode including an electrolyte composite on a lithium metal base.

Referring to FIG. 1, an electrolyte composite 11 is disposed on a lithium metal substrate 10 and includes a first block copolymer in which a structural domain 12 has a cylindrical phase and is included in a base formed of at least one of the rubbery domain or the ion conductive domain. A lithium ion conductor 14 in a form of particles may be dispersed within the base 13, to thereby have a structure in which the lithium ion conductor 14 is embedded.

Figure 2:
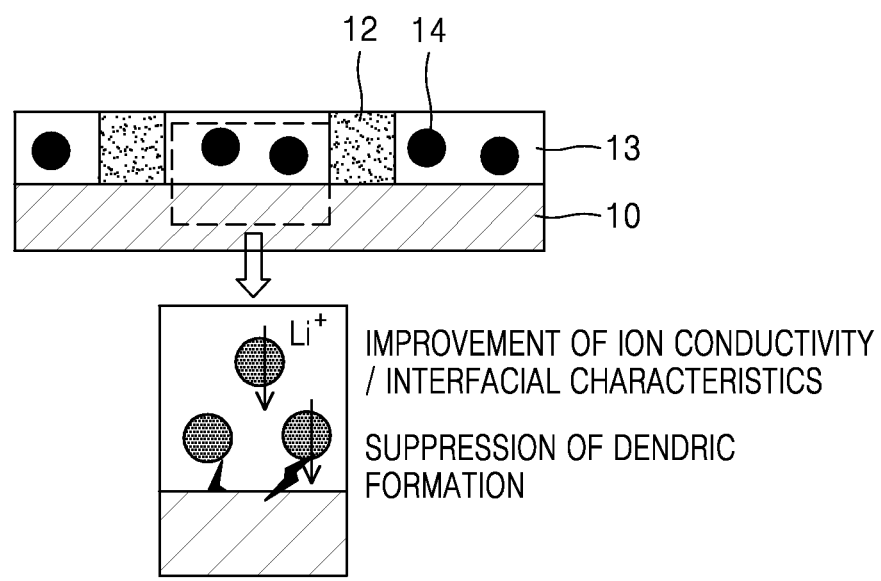
FIG. 2 is diagram for explaining operational effects of a lithium ion conductor in the structure of the negative electrode.

FIG. 2 is a diagram for explaining operational effects of the lithium ion conductor 14 in the structure of the negative electrode according to an exemplary embodiment. As shown in FIG. 2, the introduction of the lithium ion conductor 14 in the form of particles may contribute not only to the improvement of ion conductivity and interfacial characteristics of the electrolyte composite 11, but also to the suppression of lithium dendrite growth on a surface of the lithium metal substrate 10.

In another exemplary embodiment, the electrolyte composite 11 may have a core-shell structure in which the core includes the lithium ion conductor 14 and the shell includes the first block copolymer, and wherein the shell is disposed on a surface of the core of the core-shell structure. The electrolyte composite having such a core-shell structure may be dispersed within a typical polymer electrolyte.

In another exemplary embodiment, a surface of the lithium ion conductor 14 may be additionally functionalized (for example, by forming a covalent bond) with a second block copolymer that is homogeneous or heterogeneous with the first block copolymer. The lithium ion conductor 14 of which the surface is functionalized with the second block copolymer may have improved dispersibility within the matrix that is formed of the first block copolymer. In the electrolyte composite having the core-shell structure, the core may be coated with the first block copolymer.

As such, the electrolyte composite including the first block copolymer and the lithium ion conductor may have improved interfacial characteristics with respect to a lithium metal, and may be stable in (non-reactive with respect to) a liquid electrolyte. In addition, the electrolyte composite may have a strong intensity and a good ion conductivity. Since the electrolyte composite may be used to prepare a polymer electrolyte thin film, an electrolyte thin film or a protective layer for a negative electrode, each of which is stable in a liquid electrolyte, may be implemented.

The structural domain included in the first block copolymer may be a region determining mechanical properties of the first block copolymer, and may include a polymer segment having a structural repeating unit.

A non-limiting example of the polymer segment having the structural repeating unit may be a segment derived from at least one monomer selected from styrene, 4-bromostyrene, tert-butylstyrene, divinylbenzene, methyl methacrylate, isobutyl methacrylate, ethylene, propylene, dimethylsiloxane, isobutylene, N-isopropyl acrylamide, vinylidene fluoride, acrylonitrile, 4-methylpentene-1, butylene terephthalate, ethylene terephthalate, and vinylpyridine.

For example, the polymer segment having the structural repeating unit may be at least one polymer segment selected from polystyrene, hydrogenated polystyrene, polymethacrylate, poly(methyl methacrylate), polyvinylpyridine, polyvinyl cyclohexane, polyimide, polyamide, polyethylene, polybutylene, polypropylene, poly(4-methylpentene-1), poly(butylene terephthalate), poly(isobutyl methacrylate), poly(ethylene terephthalate), polydimethylsiloxane, polyacrylonitrile, polymaleic acid, poly(maleic anhydride), poly(methacrylic acid), poly(tert-butyl vinyl ether), poly(cyclohexyl methacrylate), poly(cyclohexyl vinyl ether), poly(tert-butyl vinyl ether), polyvinylidene fluoride, and polydivinylbenzene; or a copolymer of at least two repeating units that constitute said polymers.

The rubbery domain and the ion conductive domain may provide an ion conduction pathway in the electrolyte composite, and thereby may attribute to the first block copolymer strong intensity, ductility, and elasticity characteristics at the same time.

The rubbery domain may include a polymer segment having a rubbery repeating unit, and a non-limiting example of the polymer segment having the rubbery repeating unit may be at least one selected from polyisoprene, polybutadiene, polychloroprene, polyisobutylene, and polyurethane. Here, polyisoprene, polybutadiene, and polychloroprene may belong to a group diene polymers.

The ion conductive domain may include a polymer segment having an ion conductive repeating unit. The polymer segment having the ion conductive repeating unit may be a polymer segment having the ion conductive repeating unit in a main chain or a side chain, and any unit having an ionic conductivity may be used as the ion conductive repeating unit. For example, an alkylene oxide unit, such as ethylene oxide, may be used as the ion conductive repeating unit.

The ion conductive repeating unit may be a region responsible for further improving the ionic conductivity of the first block copolymer, and may include at least one selected from an ether monomer, an acryl monomer, a methacryl monomer, an amine monomer, an imide monomer, an alkylcarbonate monomer, a nitrile monomer, a phosphazine monomer, an olefin monomer, a diene monomer, and a siloxane monomer.

The polymer segment having the ion conductive repeating unit may be, for example, at least one selected from polypropylene oxide, poly(methylmethacrylate), poly(ethylmethacrylate), polydimethylsiloxane, polyacrylic acid, poly(methacrylic acid), poly(methylacrylate), poly(ethylacrylate), poly(2-ethylhexylacrylate), poly(butylmethacrylate), poly(2-ethylhexylmethacrylate), poly(decylacrylate), poly(ethylenevinylacetate), a polyimide, a polyamine, a polyamide, a poly(alkylcarbonate), a polynitrile, a polyphosphazine, a polyolefin, and a polydiene.

A mixed weight ratio of the polymer segment having the structural repeating unit at least one of the polymer segment having the rubbery repeating unit or the polymer segment having the ion conductive repeating unit may be in a range of about 1:1 to about 1:4.

While not wishing to be bound by theory, it is understood that when the ratio of the polymer segment having the structural repeating unit to at least one of the polymer segment having the rubbery repeating unit or the polymer segment having the ion conductive repeating unit is greater than the above range of the mixed weight ratios, the ductility of the electrolyte composite may degrade. When the ratio of the polymer segment having the structural repeating unit to at least one of the polymer segment having the rubbery repeating unit or the polymer segment having the ion conductive repeating unit is less than the above range of the mixed weight ratios, the strong intensity of the electrolyte composite may be degraded, and accordingly, the growth of lithium dendrite may not be efficiently controlled.

When the mixed weight ratio of the polymer segment having the structural repeating unit to at least one of the polymer segment having the rubbery repeating unit or the polymer segment having the ion conductive repeating unit is within the above range of the mixed weight ratios, the structural domain included in the first block copolymer may have a cylindrical phase. In an embodiment where the structural domain included in the first block copolymer has a cylindrical phase, a large amount of the rubbery domain/ion conductive domain may be impregnated with a liquid electrolyte, compared to a case where the block copolymer has a lamellar structure. Accordingly, the conduction characteristics of the liquid electrolyte and the interfacial characteristics between the lithium metal and the liquid electrolyte may be improved, and consequentially, the ionic conductivity of the liquid electrolyte may be improved.

In an exemplary embodiment, the first block copolymer may include the structural domain and the rubbery domain. When the first block copolymer includes the rubbery domain, the electrolyte composite may have improved intensity, ductility, and elasticity. Moreover, the rubbery domain may further be stabilized in a liquid electrolyte containing a carbonate organic solvent.

In an exemplary embodiment, the polymer segment having the structural repeating unit may include a block having a weight average molecular weight of about 10,000 Daltons or greater, for example about 10,000 Daltons to about 500,000 Daltons, or for example about 15,000 Daltons to about 400,000 Daltons.

The polymer segment having the structural repeating unit may include a block, and in some embodiments, the amount of the block may be in a range of about 20 parts to about 50 parts by weight or about 22 parts to about 30 parts by weight, based on 100 parts by weight of a total weight of the first block copolymer. While not wishing to be bound by a theory, it is understood that when the amount of the block of the polymer segment having the structural repeating unit is within the above ranges, the electrolyte composite may have a strong intensity and improved mechanical characteristics.

In an exemplary embodiment, the polymer segment having the rubbery repeating unit may include a block having a weight average molecular weight of about 10,000 Daltons or greater, for example about 10,000 Daltons to about 500,000 Daltons, or for example about 15,000 Daltons to about 400,000 Daltons. While not wishing to be bound by a theory, it is understood that when the block of the polymer segment having the rubbery repeating unit has a weight average molecular weight within the above ranges, the electrolyte composite may have excellent ductility, elasticity, and strong intensity.

The block copolymer may include a linear block copolymer, a branched block copolymer, or a combination thereof. The block copolymer may have any shape, for example, a lamellar, cylindrical, spherical, ellipsoidal, polyhedral, or gyroid shape, or the like. In an embodiment, the block copolymer may have an irregular shape. The branched block copolymer may be any type of copolymer known to one of ordinary skill in the art. For example, the branched block copolymer can be a stereoblock copolymer, a graft polymer, a star-shaped polymer, a comb polymer, a brush polymer, or a polymer network, without being limited thereto, and any polymer commonly used in the art as the branched block copolymer may also be used.

The polymer segment having the rubbery repeating unit may include a block, and in some embodiments, the amount of the block may be in a range of about 50 parts to about 80 parts by weight or about 70 parts to about 78 parts by weight, based on 100 parts by weight of a total weight of the first block copolymer. While not wishing to be bound by a theory, it is understood that when the amount of the block of the polymer segment having the rubbery repeating unit is within the above ranges, the electrolyte composite may have improved ductility and elasticity.

The first block copolymer may be at least one selected from a diblock copolymer (A-B) and a triblock copolymer (A-B-A' or B-A-B'), wherein the blocks A and A' may be the same or different and may be structural polymer units, each independently including at least one selected from polystyrene (PS), polydivinylbenzene, polymethylmethacrylate (PMMA), polyvinylpyridine, polyimide, polyethylene, polypropylene, polyvinylidene fluoride, polyacrylonitrile, and polydimethylsiloxane, a combination thereof and a copolymer thereof. Each of the blocks B and B' may be the same or different and may be, for example, at least one selected from polyisoprene, polybutadiene, polychloroprene, polyisopolybutylene, and polyurethane.

The block copolymer may also include a linear tetrablock copolymer A-B-A'-B'. In the tetrablock copolymer, the blocks A and A' may be the same or different and may be ion conductive polymer blocks and the blocks B and B' may be the same or different and may be non-conducting polymer blocks. Ion conductive blocks A, A' and non-conducting blocks B and B' may be selected from the same polymer blocks as described above with regard to the triblock copolymer A-B-A'.

In an exemplary embodiment, the first block copolymer of the electrolyte composite may be a block copolymer including a polystyrene first block and a polyisoprene second block;

a block copolymer including a polystyrene first block, a polyisoprene second block, and a polystyrene third block;

a block copolymer including a polystyrene first block and a polybutadiene second block; or a block copolymer including a polystyrene first block, a polybutadiene second block, and a polystyrene third block.

When the first block copolymer of the electrolyte composite is a triblock copolymer including a first block, a second block, and a third block, an amount of the first block and an amount of the third block may be each in a range of about 20 parts to about 35 parts by weight, e.g., about 22 parts to about 30 parts by weight, based on 100 parts by weight of a total weight of the first block copolymer, and an amount of the second block may be in a range of about 65 parts to about 80 parts by weight, e.g., about 70 parts to about 78 parts by weight, based on 100 parts by weight of the total weight of the first block copolymer.

Each of the first block copolymers described above may further include a polyethylene oxide block.

The lithium ion conductor may include, for example, an inorganic compound, such as a nitride inorganic substance, an oxide inorganic substance, a phosphate inorganic substance, a sulfide inorganic substance, or a LiPON inorganic substance, each of which has lithium ionic conductivity.

Any inorganic compound having ionic conductivity of at least $1 \times 10^{-4}$ S/cm, e.g., $4 \times 10^{-4}$ S/cm, $6 \times 10^{-4}$ S/cm, $8 \times 10^{-4}$ S/cm, or $1 \times 10^{-3}$ S/cm, at a temperature of about 25° C. may be used as the lithium ion conductor.

The lithium ion conductor may be, as a non-limiting example, at least one selected from $Li_3N$, $Li_2SiS_3$, $Li_4SiO_4$, $Li_4SiO_4.LiI.LiOH$, $Li_3PO_4.Li_2S.SiS_2$, $Cu_3N$, $Li_{3-y}PO_{4-x}N_x$ (wherein $0<y<3$ and $0<x<4$), $Li_2S$, $Li_2S.P_2S_5$, $Li_2S.SiS_2$, $Li_2S.GeS_2$, $Li_2S.B_2S_5$, $Li_2S.Al_2S_5$, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{3x}La_{2/(3-x)}TiO_3$ (wherein $0<x\leq 2$), $Li_{0.3}La_{0.5}TiO_3$, Na$_5$MSi$_4$O$_{12}$ (wherein M is neodymium (Nd), gadolinium (Gd), or dysprosium (Dy)), Li$_5$ZrP$_3$O$_{12}$, Li$_5$TiP$_3$O$_{12}$, Li$_3$Fe$_2$P$_3$O$_{12}$, Li$_4$NbP$_3$O$_{12}$, Li$_{1+x}$(M,Al,Ga)$_x$(Ge$_{1-y}$Ti$_y$)$_{2-x}$ (PO$_4$)$_3$ (wherein 0<x≤0.8 and 0≤y≤1.0; and M is Nd, samarium (Sm), europium (Eu), Gd, terbium (Tb), Dy, holmium (Ho), erbium (Er), thulium (Tm), or ytterbium (Yb)), Li$_{1+x+y}$Q$_x$(Ge$_{1-y}$Ti$_y$)$_{2-x}$Si$_y$P$_{3-y}$O$_{12}$ (wherein 0<x≤0.4 and 0≤y≤0.6; and Q is aluminum (Al) or gallium (Ga)), Li$_6$BaLa$_2$Ta$_2$O$_{12}$, Li$_{7-y}$La$_{3-x}$A$_x$Zr$_{2-y}$M$_y$O$_{12}$ (wherein A is yttrium (Y), Nd, Sm, or Gd; M is Nb or tantalum (Ta); and 0≤x<3 and 0≤y<2), Li$_5$La$_3$Nb$_2$O$_{12}$, Li$_5$La$_3$M$_2$O$_{12}$ (wherein M is Nb or Ta), and Li$_{7+x}$Zn$_x$La$_{3-x}$Zr$_2$O$_{12}$ (wherein 0<x<3).

In an exemplary embodiment, the lithium ion conductor may include a compound represented by Formula 1:

Li$_{1+x}$M$_x$M'$_{2-x}$(PO$_4$)$_3$  Formula 1

In Formula 1,

M may be at least one element selected from aluminum (Al), chromium (Cr), gallium (Ga), iron (Fe), scandium (Sc), indium (In), yttrium (Y), lanthanum (La), and scandium (Sc), M' may be at least one element selected from titanium (Ti), germanium (Ge), and zirconium (Zr), and 0<x≤0.7.

In another exemplary embodiment, the lithium ion conductor may include a compound represented by Formula 2:

Li$_{1+x}$Al$_x$Ge$_y$Ti$_{2-x-y}$(PO$_4$)$_3$  Formula 2

In Formula 2, 0<x≤0.7 and 0<y≤0.5.

For example, the lithium ion conductor may include Li$_{1.4}$Al$_{0.4}$Ge$_{0.2}$Ti$_{1.4}$(PO$_4$)$_3$.

The lithium ion conductor may be formed of particles having an average particle diameter in a range of about 100 nanometers (nm) to about 1 micrometer (μm). While not wishing to be bound by a theory, it is understood that when the average particle diameter of the lithium ion conductor particles is within this range, it may facilitate the formation of a composite of lithium ion conductor and the first block copolymer.

An amount of the lithium ion conductor may be 10 parts by weight or less, e.g., about 0.01 parts to about 5 parts by weight or about 0.1 parts to about 5 parts by weight, based on 100 parts by weight of a total weight of the first block copolymer. While not wishing to be bound by a theory, it is understood that when the amount of the lithium ion conductor is within the above ranges, the lithium ion conductor may be easily dispersed in the first block copolymer. When the amount of the lithium ion conductor exceeds the above ranges, the lithium ion conductor shows poor dispersion, which may cause short-circuiting of the battery.

The electrolyte composite may further include at least one selected from a liquid electrolyte, a polymer ionic liquid, a solid electrolyte, and a gel electrolyte, and consequently, may further improve the ion conductivity and mechanical properties of the electrolyte.

In an exemplary embodiment, the electrolyte composite may further include a liquid electrolyte to allow the rubbery domain of the electrolyte to form an ion conduction pathway in the electrolyte.

The liquid electrolyte may further include at least one selected from an organic solvent, an ionic liquid, an alkali metal salt, and an alkali earth metal salt. For example, the organic solvent may be a carbonate compound, a glyme compound, a dioxolane compound, dimethyl ether, or 1,1,2,2-tetrafluoroethyl-2,2,3,3-tetrafluoropropyl ether.

In an exemplary embodiment, when the electrolyte composite is used together with a liquid electrolyte including an organic solvent such as a carbonate compound, the electrolyte composite may have high stability compared to the liquid electrolyte including an organic solvent, for example an organic solvent such as a carbonate compound.

An electrolyte composite that may serve as a lithium metal protection layer in the related art may be a gel-type polymer membrane including a polymer and a liquid electrolyte. However, the polymer for forming the gel-type polymer membrane may have unsatisfactory mechanical properties, or insufficient ductility and elasticity even with strong intensity, and thus may not satisfactorily suppress the growth of lithium dendrite.

When the gel-type electrolyte is prepared using a polymer having weak intensity, inorganic nanoparticles may be further added. As such, when inorganic nanoparticles are added, the gel-type electrolyte may have improved mechanical properties, in addition to increased interfacial resistance.

In addition, when an electrolyte composite includes a lithium metal protection layer that includes a first block copolymer including a polyethylene oxide domain, the lithium metal protection layer may be dissolved in an electrolyte including a carbonate organic solvent.

However, in another exemplary embodiment, the electrolyte composite may have improved intensity, ductility, and elasticity properties at the same time, and may further have improved stability against a liquid electrolyte including a carbonate organic solvent, by using a first block copolymer including a structural domain and a rubbery domain/ion conductive domain serving as an ion conduction pathway. In addition, the electrolyte composite may have a uniform ion distribution at the interface with an electrode to effectively suppress formation of dendrites. Accordingly, a lithium secondary battery with improved cycle characteristics may be manufactured using any of the electrolyte composites according to the exemplary embodiments.

In an exemplary embodiment, the electrolyte composite may further include at least one kind of inorganic particle. The inorganic particle may include at least one selected from a metal hydroxide, a metal carbonate, a metal carboxylate, a metal silicate, a metal aluminosilicate, a metal carbide, a metal nitride, a metal halide, a metal nitrate, a carbon oxide, a carbonaceous material, and an organic-inorganic composite. The inorganic particle may be at least one selected from SiO$_2$, TiO$_2$, ZnO, Al$_2$O$_3$, BaTiO$_3$, graphite oxide, graphene oxide, cage-structured silsesquioxane, Li$_2$CO$_3$, Li$_3$PO$_4$, Li$_3$N, Li$_3$S$_4$, Li$_2$O, montmorillonite, and a metal-organic framework (MOF). When the electrolyte composite further includes such inorganic particles, the mechanical properties of the electrolyte composite may be further improved. The inorganic particles may have an average particle diameter of 1 μm or less, e.g., about 500 nm or less or about 100 nm or less. For example, the inorganic particles may have an average particle diameter in a range of about 1 nm to about 100 nm, e.g., about 5 nm to about 100 nm, about 10 nm to about 100 nm, about 10 nm to about 70 nm, or about 30 nm to about 70 nm. When the average particle diameter of the inorganic particles is within the above ranges, it may be possible to prepare an electrolyte having improved film formability and improved mechanical properties without a reduction in ionic conductivity.

The cage-structured silsesquioxane may be a polyhedral oligomeric silsesquioxane (POSS). The number of silicon atoms in the POSS may be about 8 or less, for example, 6 or 8.

The cage-structured silsesquioxane may be a compound represented by Formula 3.

$$Si_kO_{1.5k}(R^1)_a(R^2)_b(R^3)_c \quad \text{Formula 3}$$

In Formula 3, $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group. In Formula 1, k=a+b+c, and 6≤k≤20.

The cage-structured silsesquioxane may be a compound represented by Formula 4 or a compound represented by Formula 5.

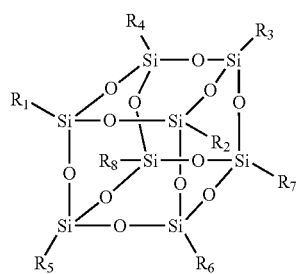

Formula 4

In Formula 4, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

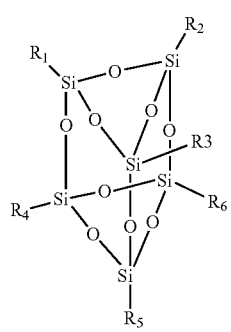

Formula 5

In Formula 5, $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a C0-C30 silicon-containing functional group.

In an exemplary embodiment, $R_1$ to R, in the cage-structured silsesquioxane may be heptaisobutyl groups. For example, the cage-structured silsesquioxane may be, for example, heptaisobutyl-t8-silsesquioxane.

The MOF may be a porous crystalline compound in which a Group 12 to Group 15 metal ion or a Group 12 to Group 15 metal ionic cluster is chemically bonded to an organic ligand.

The organic ligand refers to an organic group that may form a chemical bond, such as a coordinate bond, an ionic bond, or a covalent bond. For example, an organic group having at least two binding sites for such metal ions may form a stable structure through binding with the metal ions.

The Group 2 to Group 15 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a ligand derived from at least one of compounds having at least one functional group, selected from an aromatic dicarboxylic acid group, an aromatic tricarboxylic acid group, an imidazole group, a tetrazole group, a 1,2,3-triazole group, a 1,2,4-triazole group, a pyrazole group, an aromatic sulfonic acid group, an aromatic phosphoric acid group, an aromatic sulfinic acid group, an aromatic phosphinic acid group, a bipyridine group, an amino group, an imino group, an amide group, a methane dithio acid group ($-CS_2H$), a methane dithio acid anion group ($-CS_2^-$), a pyridine group, and a pyrazine group.

The aromatic dicarboxylic acid group or the aromatic tricarboxylic acid group may be a benzene dicarboxylic acid group, a benzene tricarboxylic acid group, a biphenyl dicarboxylic acid group, or a triphenyl-dicarboxylic acid group.

The organic ligand may be a ligand derived from a compound represented by Formula 6:

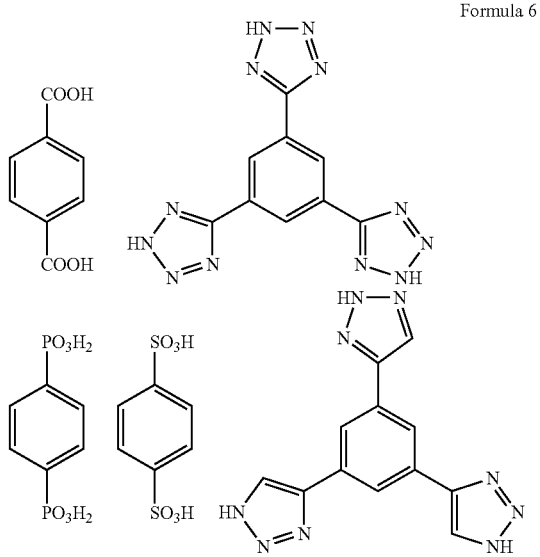

Formula 6

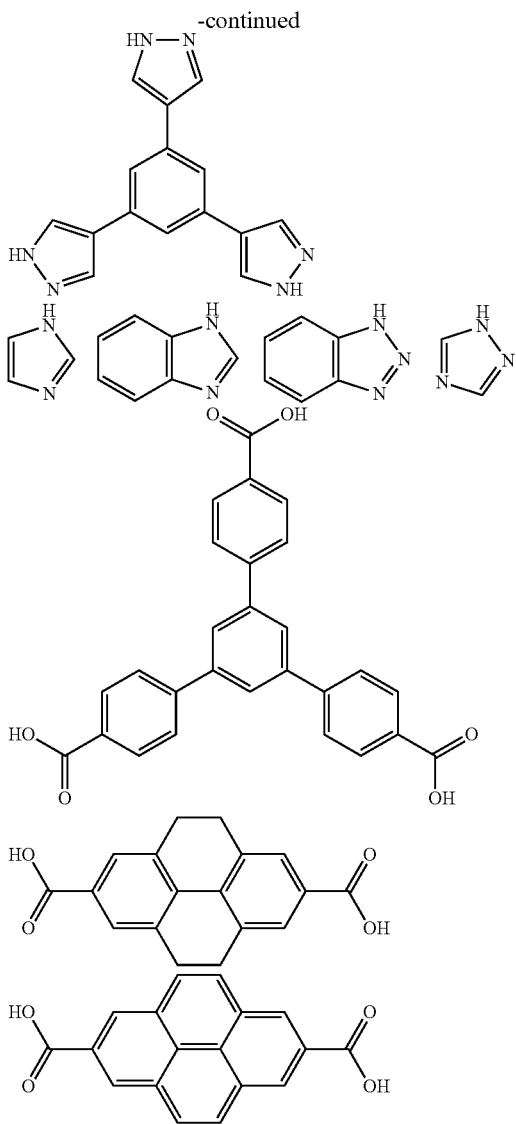

The MOF may be, for example, $Ti_8O_8(OH)_4[O_2C-C_6H_4-CO_2]_6$, Cu (bpy)$(H_2O)_2(BF_4)_2$(bpy){wherein bpy=4,4'-bipyridine}, $Zn_4O(O_2C-C_6H_4-CO_2)_3$ (Zn-terephthalic acid-MOF, Zn-MOF), or Al(OH){$O_2C-C_6H_4-CO_2$}.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

An amount of the inorganic particles may be in a range of about 1 part to about 40 parts by weight, e.g., about 5 parts to about 20 parts by weight, based on 100 parts by weight of the first block copolymer. While not wishing to be bound by theory, it is understood that when the amount of the inorganic particles is within the above ranges, an electrolyte with improved mechanical properties and improved ionic conductivity may be manufactured.

In an exemplary embodiment, the electrolyte composite may further include an ionic liquid.

The ionic liquid refers to a salt in a liquid state at room temperature or a fused salt at room temperature that consists only of ions having a melting point equal to or below room temperature. The ionic liquid may be at least one selected from compounds each including:

i) a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, and a triazolium cation, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$.

The ionic liquid may be, for example, at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bit(trifluoromethylsulfonyl)imide, and 1-ethyl-3-methylimidazolium bis(trifluoromethylsulfonyl)imide.

An amount of the ionic liquid may be in a range of about 5 parts to about 40 parts by weight, e.g., about 10 parts to about 20 parts by weight, based on 100 parts by weight of a total weight of the first block copolymer. When the amount of the ionic liquid is within the above ranges, an electrolyte with improved mechanical properties and improved ionic conductivity may be manufactured.

In an exemplary embodiment, the electrolyte composite may further include at least one selected from an alkali metal salt and an alkali earth metal salt to have further improved ionic conductivity.

An amount of the at least one selected from the alkali metal salt and the alkali earth metal salt may be in a range of about 10 parts to about 70 parts by weight, e.g., about 20 parts to about 50 parts by weight, based on 100 parts by weight of the first block copolymer.

While not wishing to be bound by a theory, it is understood that when the amount of the at least one selected from an alkali metal salt and an alkali earth metal salt is within the above ranges, the electrolyte may have improved ionic conductivity. Examples of the alkali metal salt or alkali earth metal salt are chlorides, hydrides, nitrides, phosphides, sulfonamides, triflates, thiocyanates, perchlorates, borates, or selenides, each of which includes an alkali metal or an alkali earth metal. Examples of the alkali metal or alkali earth metal are lithium, sodium, potassium, barium, and calcium.

For example, the alkali metal salt or alkali earth metal salt may be at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $LiN(SO_2F)_2$, $LiSbF_6$, $Li(CF_3SO_2)_3C$, $LiN(SO_2C_2F_5)_2$, $LiN(SO_2CF_3)_2$, $LiN(SO_2CF_2CF_3)_2$, $LiN(CF_3SO_2)_2$, $LiPF_3(CF_2CF_3)_3$, $LiPF_3(C_2F_5)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, $Ca(TFSI)_2$, and $LiPF_3(CF_2CF_3)_3$.

The alkali metal salt or alkali earth metal salt may be at least one lithium salt selected from $LiClO_4$, $LiCF_3SO_3$, $LiBF_4$, $LiN(CF_3SO_2)_2$, $LiN(SO_2F)_2$, $LiPF_6$, $LiAsF_6$, $LiSbF_6$, and $LiPF_3(CF_2CF_3)_3$.

When the electrolyte composite includes an ionic liquid and a lithium salt, a mole ratio (IL/Li) of the ionic liquid to lithium ions may be in a range of about 0.1 to about 2.0, e.g., about 0.2 to about 1.8 and about 0.4 to about 1.5. While not wishing to be bound by a theory, it is understood that when the electrolyte composite has a mole ratio of the ionic liquid to lithium ions within the above ranges, the electrolyte composite may have high lithium ion mobility, high ionic conductivity, and improved mechanical properties to effectively suppress growth of lithium dendrite on the negative surface of the lithium secondary battery.

In an exemplary embodiment, the electrolyte composite may have ionic conductivity of about $1 \times 10^{-4}$ S/cm or more, e.g., about $5 \times 10^{-4}$ S/cm or more or about $1 \times 10^{-3}$ S/cm or more, at a temperature of 25° C.

The electrolyte composite electrolyte may have a tensile modulus (Young's modulus) of about 10 mega Pascals (MPa) or greater, e.g., about 10 MPa to about 50 MPa, at a temperature of 25° C. The electrolyte composite may have an elongation of about 500% or greater, e.g., about 600% or greater, about 1,200% or greater, or about 1,300% or greater, at a temperature of 25° C. For example, when including a polystyrene-polyisoprene-polystyrene block copolymer, the electrolyte composite may have an elongation of about 1,200% or greater of about 1,300% or greater. For example, when including a polystyrene-polybutadiene-polystyrene block copolymer, the electrolyte composite may have an elongation of about 600% or greater.

The electrolyte composite may have improved mechanical properties, including ductility and elasticity, and improved ionic conductivity at a temperature of about 25° C. that are both satisfactory for battery performance.

In an exemplary embodiment, the electrolyte composite may have a tensile strength of about 2.0 MPa or greater at a temperature of 25° C. Accordingly, an interfacial resistance at a temperature of about 25° C. of the electrolyte composite with respect to lithium metal that is obtained from a Nyquist plot through an impedance measurement may be smaller than the resistance of bare lithium metal by about 10% or more. In this regard, when an electrolyte composite according to any of the exemplary embodiments above is used as a lithium metal protection layer, the electrolyte composite may have improved interfacial characteristics due to a reduced interfacial resistance with respect to lithium metal, compared to when only bare lithium metal is used.

In addition, the electrolyte composite may have an oxidation current or reduction current of about 0.05 milli Amperes per square centimeter (mA/cm$^2$) or less with respect to lithium metal in a voltage range of about 0.0 Volts (V) to about 6.0 V.

In an exemplary embodiment, the electrolyte composite may be formed as a free-standing membrane.

The electrolyte composite may be used as a solid polymer electrolyte for solid state batteries, or as an electrolyte for lithium secondary batteries such as lithium air batteries, lithium ion batteries, and lithium polymer batteries.

For example, the electrolyte composite may be a mixed electrolyte that further includes at least one selected from a liquid electrolyte, a solid electrolyte, a gel electrolyte, a polymer ionic liquid, an inorganic particle, and a separator.

In an exemplary embodiment, the lithium secondary battery may further include at least one selected from a liquid electrolyte, a polymer ionic liquid, a solid electrolyte, and a gel electrolyte. The at least one of a liquid electrolyte, a polymer ionic liquid, a gel electrolyte, or a solid electrolyte, and a separator may be disposed between the positive electrode and the electrolyte composite.

When at least one selected from a liquid electrolyte, a polymer ionic liquid, a solid electrolyte, and a gel electrolyte is further included, the ionic conductivity and mechanical properties of the electrolyte composite may be further improved.

In an exemplary embodiment, the electrolyte composite may further include a liquid electrolyte to allow the structural domain of the electrolyte composite to form an ion conduction pathway in the electrolyte composite.

The liquid electrolyte may further include at least one selected from an organic solvent, an ionic liquid, an alkali metal salt, and an alkali earth metal salt.

The organic solvent may be a carbonate compound, a glyme compound, and a dioxolane compound.

The carbonate compound may be, for example, ethylene carbonate, propylene carbonate, dimethyl carbonate, fluoroethylene carbonate, diethyl carbonate, or ethylmethyl carbonate.

The glyme compound may be, for example, at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

The dioxolane compound may be, for example, at least one selected from 1,3-dioxolane, 4,5-diethyl-dioxolane, 4,5-dimethyl-dioxolane, 4-methyl-1,3-dioxolane, and 4-ethyl-1,3-dioxolane. The organic solvent may be, for example, 2,2-dimethoxy-2-phenyl acetophenone, dimethyl ether (DME), dimethoxy ethane, diethoxy ethane, tetrahydrofuran, gamma-butyrolactone, 1,1,2,2-tetrafluoroethyl 2,2,3,3-tetrafluoropropyl ether, or a combination thereof.

The polymer ionic liquid may be, for example, a polymerization product of ionic liquid monomers, or a polymeric compound. The polymer ionic liquid is highly soluble in an organic solvent, and thus may further improve the ionic conductivity of the electrolyte when further added.

In preparing a polymer ionic liquid by polymerization of ionic liquid monomers as described above, the resulting product from the polymerization reaction may be washed and dried, followed by an anionic substitution reaction to obtain appropriate anions that may improve solubility of the polymerization product in an organic solvent.

In an exemplary embodiment, the polymer ionic liquid may include a repeating unit that includes:

i) a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, and a triazolium cation, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In another exemplary embodiment, the polymer ionic liquid may be prepared by polymerization of ionic liquid monomers. The ionic liquid monomers may have a functional group polymerizable with a vinyl group, an aryl group, an acrylate group, and a methacrylate group, and may include a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, and a triazolium cation, and at least one of the above-listed anions.

The ionic liquid monomers may be, for example, 1-vinyl-3-ethylimidazolium bromide, a compound represented by Formula 7, or a compound represented by Formula 8:

Formula 7

Formula 8

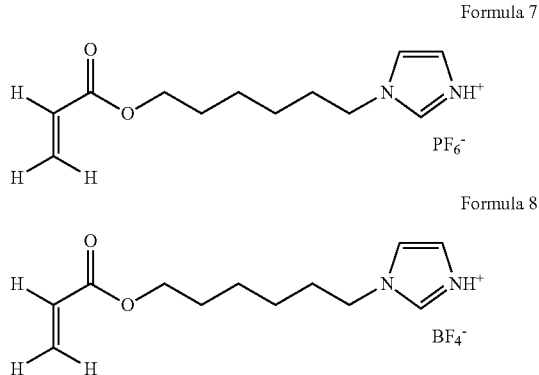

For example, the polymer ionic liquid may be a compound represented by Formula 9 and a compound represented by Formula 10:

Formula 9

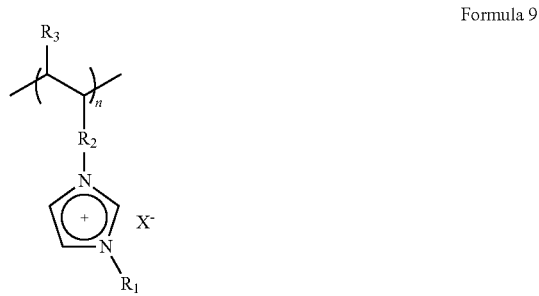

In Formula 9, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$R_2$ may indicate a single chemical bond or may be a C1-C3 alkylene group, a C6-C30 arylene group, a C2-C30 heteroarylene group, or a C4-C30 carbocyclic group;

$X^-$ may indicate an anion of the ionic liquid; and n may be from about 500 to about 2,800.

Formula 10

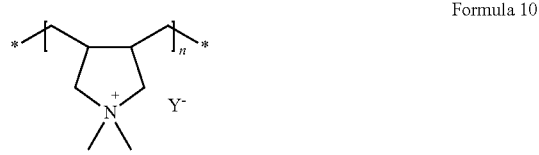

In Formula 10, $Y^-$ may be the same as $X^-$ as defined in Formula 7; and n may be from about 500 to about 2800. In Formula 9, $Y^-$ may be, for example, bis(trifluoromethanesulfonyl)imide (TFSI), $BF_4$, or $CF_3SO_3$.

The polymer ionic liquid may include, for example, a cation selected from poly(1-vinyl-3-alkylimidazolium) cation, a poly(1-allyl-3-alkylimidazolium) cation, and a poly(1-(methacryloyloxy-3-alkylimidazolium) cation, and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3$, $C_3F_7COO^-$, and $(CF_3SO_2)(CF_3CO)N^-$.

For example, the compound of Formula 9 may be polydiallydimethyl ammonium bis(trifluoromethanesulfonyl)imide.

In an exemplary embodiment, the polymer ionic liquid may include a low-molecular weight polymer, a thermally stable ionic liquid, and a lithium salt. The low-molecular weight polymer may have an ethylene oxide chain. The low-molecular weight polymer may be a glyme, and examples of the glyme include polyethyleneglycol dimethylether (polyglyme), tetraethyleneglycol dimethyl ether (tetraglyme), and triethyleneglycol dimethylether (triglyme).

The low-molecular weight polymer may have a weight average molecular weight in a range of about 75 to about 2,000, e.g., about 250 to about 500. The thermally stable ionic liquid may be the same as those listed above in conjunction with the above-described ionic liquid. The lithium salt may be any of the compounds described above as alkali metal salts as long as it includes lithium as an alkali metal.

In an exemplary embodiment, the electrolyte composite may further include a gel electrolyte. When the electrolyte further includes a gel electrolyte, the conductivity of the electrolyte composite may be further improved.

The gel electrolyte may be any electrolyte in gel form known in the art.

For example, the gel electrolyte may include a polymer and a polymer ionic liquid.

For example, the polymer may be a solid graft (block) copolymer electrolyte.

The solid electrolyte may be an organic solid electrolyte or an inorganic solid electrolyte.

The organic solid electrolyte may be, for example, a polyethylene derivative, a polyethylene oxide derivative, a polypropylene oxide derivative, a phosphoric acid ester polymer, polyester sulfide, polyvinyl alcohol, polyfluoride vinylidene, or a polymer including an ionic dissociative group.

The inorganic solid electrolyte may be, for example, $Li_3N$, $LiI$, $Li_5NI_2$, $Li_3N.LiI.LiOH$, $Li_2SiS_3$, $Li_4SiO_4$, $Li_4SiO_4.LiI.LiOH$, $Li_3PO_4.Li_2S.SiS_2$, $Cu_3N$, $LiPON$, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element such as Nd, Gd, or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 < x \leq 0.8$ and $0 \leq y \leq 1.0$; and M is Nd, Sm, Eu, Gd, Tb, Dy, Ho, Er, Tm, or Yb), $Li_{1+x+y}Q_x(Ge_{1-y}Ti_y)_{2-x}Si_yP_{3-y}O_{12}$ (wherein $0 < x \leq 0.4$ and $0 < y \leq 0.6$; and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), or $Li_{7+x}A_xLa_{3-x}Zr_2O_{12}$ (wherein $0 < x < 3$; and A is Zn).

In an exemplary embodiment, the electrolyte composite may be in solid or gel form.

The electrolyte composite may be in solid or gel form. The electrolyte may be formed as a membrane, film, or sheet having a thickness of about 200 μm or less, e.g., about 0.1 μm to about 100 μm or about 1 μm to about 40 μm. A solid electrolyte composite in the form of sheet, film, or membrane may be formed using a known technology, such as spin coating, roll coating, curtain coating, extruding, casting, screen printing, or inkjet printing.

In an exemplary embodiment, when the electrolyte composite is a thin film, the electrolyte composite may also have improved intensity, elasticity, and ductility properties, improved ionic conductivity and improved lithium ion mobility, and improved stability against the liquid electrolyte. Accordingly, the electrolyte composite may serve as a protective layer for lithium metal. Consequently, problems with lithium secondary batteries in terms of lifetime and safety, caused from the dendritic formation by highly reactive lithium, may be prevented with the electrolyte composite. Therefore, a lithium secondary battery with improved capacity retention rate may be manufactured using an electrolyte composite according to any of the above-described exemplary embodiments.

In an exemplary embodiment, the electrolyte composite may be suitable for use in a high-voltage lithium secondary battery. The term "high-voltage" used herein refers to a charging voltage in a range of about 4.0 V to about 5.5 V.

Hereinafter, a method of manufacturing the electrolyte composite will be described.

First, the method includes obtaining an electrolyte composition that includes a first block copolymer including a structural domain and at least one of a rubbery domain and an ion conductive domain.

An organic solvent may be added to the electrolyte composition. The organic solvent may be any solvent available as an organic solvent in the art. For example, the organic solvent may be tetrahydrofuran, N-methylpyrrolidone, acetonitrile, benzonitrile, 2-methyltetrahydrofuran, y-butyrolactone, dioxolane, 4-methyldioxolane, N,N-dimethyl formamide, N,N-dimethyl acetamide, N,N-dimethyl sulfoxide, dioxane, 1,2-dimethoxyethane, sulfolane, dichloroethane, chlorobenzene, nitrobenzene, diethylene glycol, dimethyl ether, or a combination thereof. An amount of the organic solvent may be in a range of about 100 parts to about 3,000 parts by weight based on 100 parts by weight of the first block copolymer.

In the obtaining of the electrolyte composition, at least one selected from an ionic liquid and a polymer ionic liquid, and/or at least one selected from an alkali metal salt and an alkali earth metal salt may be further added.

An electrolyte composite in the form of a membrane may be formed using the electrolyte composition, for example, by coating a substrate with the electrolyte composition, drying the electrolyte composition to form an electrolyte membrane, and separating the electrolyte membrane from the substrate.

The coating may be performed by any method available to form electrolytes in the art, for example, using spin coating, roll coating, curtain coating, extruding, casting, screen printing, inkjet printing, or a by coating with a doctor blade.

The electrolyte composite may have an oxidation current or reduction current of about 0.05 mA/cm$^2$ or less in a voltage range of about 0.0 V to about 6.0 V with respect to lithium metal.

The electrolyte composite may be electrochemically stable in a voltage range of about 0 V to about 6.0 V, e.g., about 0 V to about 5.0 V or about 0 V to about 4.0 V, with respect to lithium. In an exemplary embodiment, the electrolyte composite may have an electrochemically stable wide voltage window, and thus may be applicable to an electrochemical device operating at high voltage.

In the electrolyte composite, a current density resulting from side reactions with respect to lithium, not from intercalation/deintercalation of lithium ions may be about 0.05 mA/cm$^2$ or less at a voltage of about 0 V, e.g., about 0.02 mA/cm$^2$ or less or about 0.01 mA/cm$^2$ or less.

For example, a current density of the electrolyte composite resulting from oxidation reactions with respect to lithium at a voltage of about 5.0 V may be about 0.05 mA/cm$^2$ or less, e.g., about 0.04 mA/cm$^2$ or less or about 0.02 mA/cm$^2$ or less.

According to another aspect, a lithium secondary battery may include:
a positive electrode,
a negative electrode, and
an electrolyte composite according to any of the above-described embodiments disposed between the positive electrode and the negative electrode.

In an exemplary embodiment, the negative electrode may be a lithium metal or lithium metal alloy electrode, and the lithium secondary battery may further include at least one selected from a liquid electrolyte, a gel electrolyte, a solid electrolyte, a polymer ionic liquid, and a separator, disposed between the positive electrode and the electrolyte composite.

In an exemplary embodiment, the negative electrode may be a lithium metal or lithium metal alloy electrode, and the lithium secondary battery may further include a liquid electrolyte including at least one selected from an organic solvent, an ionic liquid, an alkali metal salt, and an alkali earth metal salt, between the positive electrode and the electrolyte composite.

Lithium secondary batteries have good voltage characteristics such as high capacity and high energy density, and thus may be widely used in mobile phones, laptop computers, storage batteries for a power generating unit using wind power or sunlight, electric vehicles, uninterruptible power supplies (UPS), household storage batteries, and the like.

FIGS. 3A to 3D are schematic views illustrating structures of lithium secondary batteries according to an exemplary embodiment.

Figure 3A:
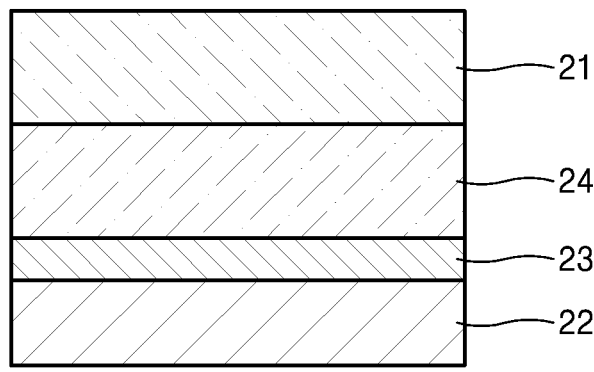
FIGS. 3A to 3D are schematic views illustrating structures of lithium secondary batteries according to an exemplary embodiment.

Referring to FIG. 3A, a lithium battery according to an exemplary embodiment may have a structure including an electrolyte composite 23 according to the above-described embodiments disposed between a positive electrode 21 and a negative electrode 22. The lithium secondary battery may further include an intermediate layer 24 disposed between the electrolyte composite 23 and the positive electrode 21. The intermediate layer 24 may have a different composite from the electrolyte composite 23 and may include at least one selected from a liquid electrolyte, a polymer ionic liquid, a solid electrolyte, a gel electrolyte, and a separator.

Since the electrolyte composite 23 is disposed on at least part of a surface of the negative electrode 22, the surface of the negative electrode 22 may be mechanically and electrochemically stable. Accordingly, dendritic growth on the surface of the negative electrode 22 during charging and discharging of the lithium secondary battery may be suppressed, and interfacial stability between the negative electrode 22 and the electrolyte composite 23 may be improved, and thereby the cycle characteristics of the lithium secondary battery may also be improved.

The electrolyte composite 23 may serve as a protective layer for the surface of the negative electrode 22 by completely coating the surface of the negative electrode 22. For example, the electrolyte composite 23 may prevent the negative electrode 22 from directly contacting a liquid electrolyte having high reactivity to the surface of the negative electrode 22, wherein the surface of the negative electrode 22 is disposed between the electrolyte and the positive electrode 21. Accordingly, the electrolyte composite 23 may protect the negative electrode 22 to improve the stability of the negative electrode 22.

Figure 3B:
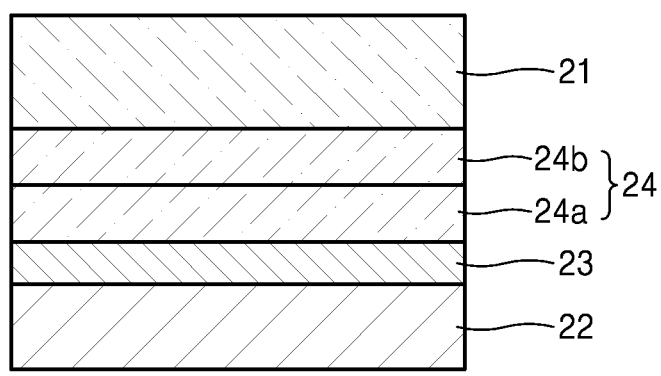

The intermediate layer 24 may have a two-layer structure including a liquid electrolyte 24a and a solid electrolyte 24b that are sequentially disposed on one another, as illustrated in FIG. 3B. The liquid electrolyte 24a may be disposed adjacent to the electrolyte composite 23. The lithium secondary battery may have a stack structure of negative electrode/electrolyte composite/intermediate layer (consisting of liquid electrolyte/solid electrolyte)/positive electrode.

Figure 3C:
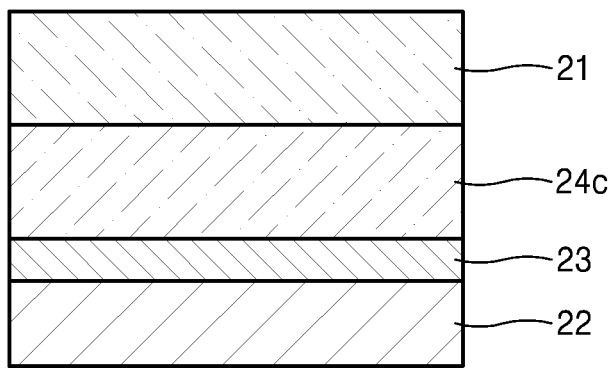

Referring to FIG. 3C, a lithium secondary battery according to another exemplary embodiment may include a separator 24c as an intermediate layer. The separator 24c may be a multilayer including at least two layers of polyethylene, polypropylene, polyvinylidene fluoride, or a combination thereof. For example, the separator 24c may be a mixed multilayer, such as a 2-layer separator of polyethylene/polypropylene, a 3-layer separator of polyethylene/polypropylene/polyethylene, or a 3-layer separator of polypropylene/polyethylene/polypropylene. The separator 24c may further include an electrolyte including a lithium salt and an organic solvent.

Figure 3D:
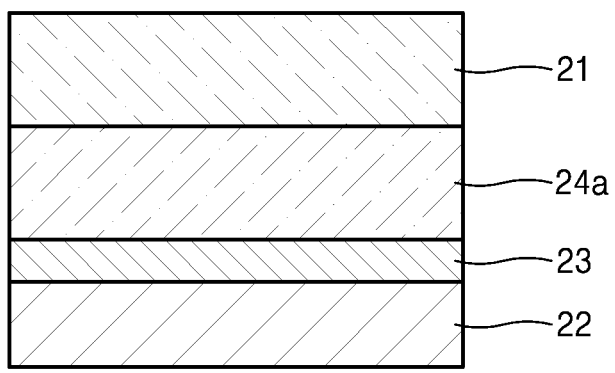

Referring to FIG. 3D, a lithium secondary battery according to another exemplary embodiment may include a liquid electrolyte 24a as an intermediate layer. The liquid electrolyte 24a may have the same or different composition from a liquid electrolyte that the electrolyte composite 23 may include.

In FIGS. 3A to 3D, the positive electrode 21 may be a porous positive electrode. The porous positive electrode may be a positive electrode including pores, or any positive electrode that allows permeation of liquid electrolyte thereinto by capillary action.

For example, the porous positive electrode may be a positive electrode that may be obtained by coating a positive active material composition including a positive active material, a conducting agent, a binder, and a solvent, and then, by drying the resulting structure. The resulting positive electrode may include pores among particles of the positive active material. The porous positive electrode may be impregnated with liquid electrolyte.

In another exemplary embodiment, the positive electrode 21 may further include a liquid electrolyte, a gel electrolyte, a solid electrolyte, or the like. The liquid electrolyte, the gel electrolyte, and the solid electrolyte may be any electrolyte that is available for lithium secondary batteries in the art and that does not react with the positive active material so as to prevent deterioration of the same during charging and discharging.

In FIGS. 3A to 3D, a lithium metal or lithium metal alloy thin film may be used as the negative electrode 22. The lithium metal or lithium metal alloy thin film may have a thickness of about 100 μm or less. For example, when the thickness of the lithium metal or lithium metal alloy thin film is about 100 μm or less, the lithium secondary battery may have stable cycle characteristics. For example, the lithium metal or lithium metal alloy thin film of the lithium secondary battery may have a thickness of about 80 μm or less, e.g., about 60 μm or less or in a range of about 0.1 μm to about 60 μm. As known in the related art, when such a lithium metal or lithium metal alloy thin film has a thickness of about 100 μm or less, it is difficult to implement a lithium secondary battery with stable cycle characteristics since the thickness of the lithium metal or lithium metal alloy thin film may be increased due to a side reaction, dendritic formation, or the like. However, lithium secondary battery with stable cycle characteristics may be manufactured using any of the electrolyte composite according to the above-described embodiments.

Figure 4:
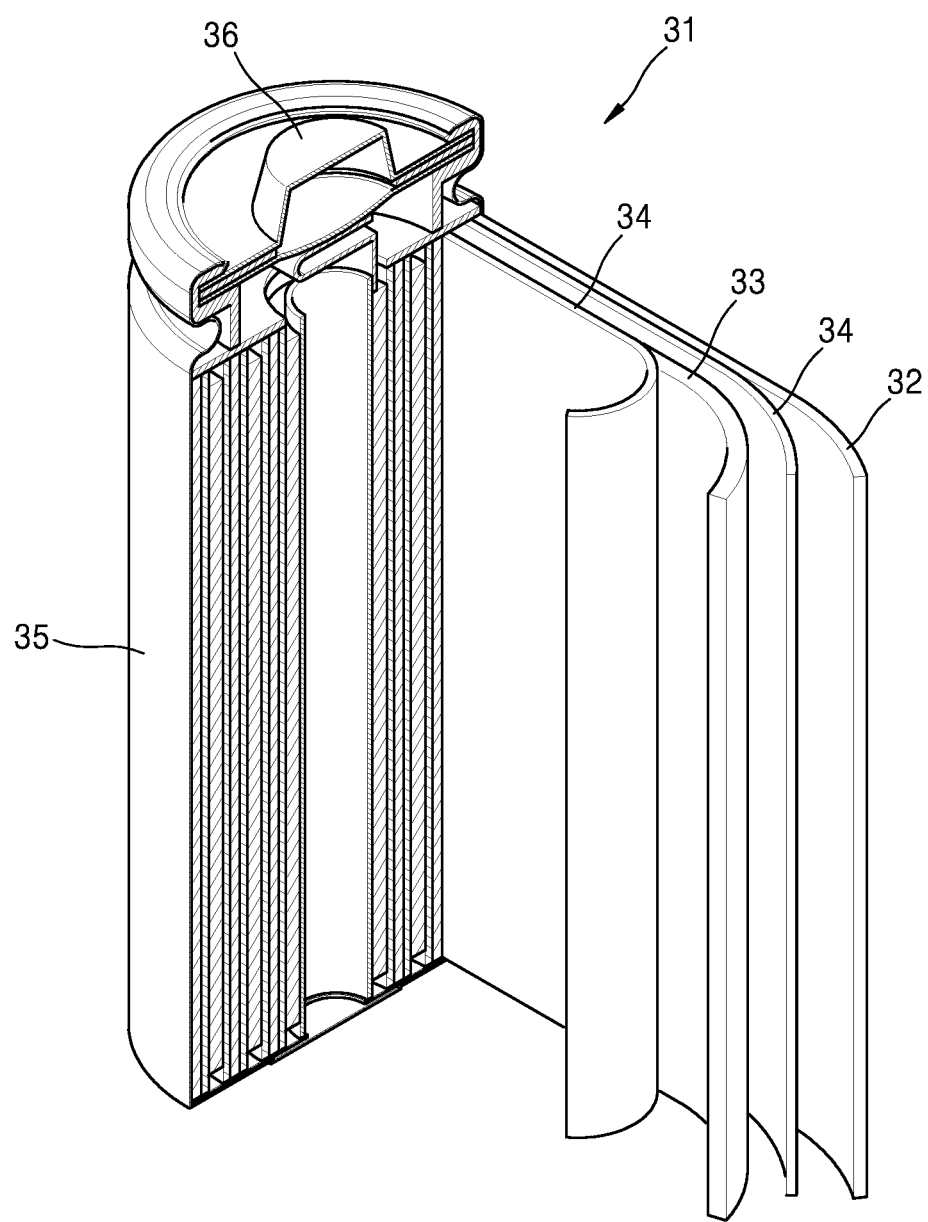
FIG. 4 is an exploded perspective view illustrating a lithium secondary battery according to another exemplary embodiment.

FIG. 4 is an exploded perspective view illustrating a structure of a lithium secondary battery 31 according to another exemplary embodiment.

Referring to FIG. 4, the lithium secondary battery 31 may include a positive electrode 33, an negative electrode 32, and an electrolyte composite 34 acceding to an exemplary embodiment. The positive electrode 33, the negative electrode 32, and the electrolyte composite 34 may be rolled or folded, and then, may be accommodated in an electrode case 35, followed by injecting an liquid electrolyte into the battery case 35 and sealing with a cap assembly 36, thereby completing manufacture of the lithium secondary battery 31. The cattery case 35 may be a cylindrical, rectangular, or thin-film type. For example, the lithium secondary battery may be a large thin-film battery.

A separator (not shown) may be further disposed between the positive electrode 33 and negative electrode 32 to form an electrode assembly. The electrode assembly may be staked on another electrode assembly to form a bicell structure, which may then be impregnated with liquid electrolyte. The resultant may be accommodated in a pouch and then sealed, thereby completing the manufacture of a lithium secondary battery.

In an exemplary embodiment, a plurality of electrode assemblies may be stacked one another to form a battery pack. The battery pack may be applicable in any device that needs a high capacity, for example, a laptop computer, a smart phone, an electric vehicle, or the like.

The lithium secondary battery may be, for example, a lithium air battery, a lithium sulfur battery, or the like.

According to another aspect, a lithium secondary battery includes:

a positive electrode, a negative electrode, and any of the electrolyte composites according to the above-described embodiments, wherein the negative electrode is a lithium metal or lithium metal alloy electrode. For example, the lithium secondary battery may be a lithium metal battery.

As described above, the lithium secondary battery may further include at least one selected from a liquid electrolyte, a gel electrolyte, a polymer electrolyte, a polymer ionic liquid, and a separator, disposed between the electrolyte composite and the positive electrode.

The electrolyte composite may serve as a protective layer for the lithium metal or lithium metal alloy electrode. The electrolyte may perform its own function with improved mechanical properties, without any organic solvent such as a carbonate solvent. When the electrolyte composite is disposed on a surface of the lithium negative electrode, dendrite growth on the surface of the negative electrode after charging and discharging may be effectively suppressed due to improved interfacial characteristics between the electrolyte composite and the lithium metal. The electrolyte may also be stable against a liquid electrolyte.

In an exemplary embodiment, the lithium secondary battery may have an operation voltage in a range of about 4.0 V to about 5.0 V, e.g., about 4.5 V to about 5.0 V.

Each of the components of the lithium secondary battery including any of the electrolyte composites according to the above-described embodiments, and a method of manufacturing a lithium secondary battery including such components will be described as follows.

A positive active material for the positive electrode may include at least one selected lithium cobalt oxide, lithium nickel cobalt manganese oxide, lithium nickel cobalt aluminum oxide, lithium iron phosphate, and lithium manganese oxide, but is not limited thereto. Any positive active material available in the art may be used.

For example, the positive active material may be a compound represented by one of the following formulae: $Li_aA_{1-b}B'_bD'_2$ (wherein $0.90 \le a \le 1.8$ and $0 \le b \le 0.5$); $Li_aE_{1-b}B'_bO_{2-c}D'_c$ (wherein $0.90 \le a \le 1.8$, $0 \le b \le 0.5$, and $0 \le c \le 0.05$); $LiE_{2-b}B'_bO_{4-c}D_c$ (wherein $0 \le b \le 0.5$ and $0 \le c \le 0.05$); $Li_aNi_{1-b-c}Co_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F_\alpha$ (wherein $0.90 \le a \le 1.8$, $0 \le c \le 0.5$, $0 \le c \le 0.05$, and $0 < \alpha < 2$); $Li_aNi_{1-b-c}Mn_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, and $0.001 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the positive active material may be a compound represented by Formula 11, a compound represented by Formula 12, or a compound represented by Formula 13:

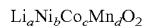  Formula 11

In Formula 11, $0.90 \le a \le 1.8$, $0 \le b \le 0.9$, $0 \le c \le 0.5$, and $0 \le d \le 0$.

  Formula 12

  Formula 13

In Formula 13, M may be Mn, Fe, Co, or Ni.

The positive electrode of the lithium secondary battery may be manufactured as follows.

A positive active material, a binder, and a solvent are mixed to prepare a positive active material composition.

A conducting agent may be further added into the positive active material composition.

A positive active material, a binder, and a solvent are mixed to prepare a positive active material composition. A conducting agent may be further added into the positive active material composition. The positive active material composition is directly coated on a metallic current collector and dried to prepare a positive electrode plate. Alternatively, the positive active material composition may be cast on a separate support to form a positive active material film, which may then be separated from the support and laminated on a metallic current collector to prepare a positive electrode plate.

The conducting agent, binder, and solvent used in the positive active material composition may be the same as those used in the negative active material composition described above. If required, a plasticizer may be further added into the positive active material composition and/or the negative active material composition to form electrode plates including pores.

The amounts of the positive active material, the conducting agent, the binder, and the solvent may be those levels that are generally used in lithium secondary batteries in the art. At least one of the conducting agent, the binder, or the solvent may not be used depending on the use and the structure of the lithium secondary battery.

The negative electrode of the lithium secondary battery may be manufactured in a substantially same manner as in the manufacture of the positive electrode, except for using a negative active material instead of the positive active material.

The negative active material may be a carbonaceous material, silicon, a silicon oxide, a silicon alloy, a silicon-carbonaceous material composite, tin, a tin alloy, a tin-carbon composite, a metal oxide, or a combination thereof.

The negative active material may be a carbonaceous material, silicon, a silicon oxide, a silicon alloy, a silicon-carbonaceous material composite, tin, a tin alloy, a tin-carbon composite, a metal oxide, or a combination thereof. The carbonaceous material may be crystalline carbon, amorphous carbon, or a combination thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, mesophase pitch carbides, sintered corks, graphene, carbon black, fullerene soot, carbon nanotubes, and carbon fibers. Any appropriate material available in the art may be used.

The negative active material may be selected from Si, $SiO_x$ (wherein $0 < x < 2$, for example, $0.5 < x < 1.5$), Sn, $SnO_2$, a silicon-containing metal alloy, and a combination thereof. A metal that is alloyable with silicon may be at least one selected from Al, Sn, Ag, Fe, Bi, Mg, Zn, In, Ge, Pb, and Ti.

The negative active material may include a metal/metalloid alloyable with lithium, an alloy thereof, or an oxide thereof. Examples of the metal/metalloid alloyable with lithium are Si, Sn, Al, Ge, Pb, Bi, Sb, a Si—Y alloy (wherein Y is an alkali metal, an alkali earth metal, a Group 13 element, a Group 14 element, a transition metal, a rare earth element, or a combination thereof except for Si), a Sn—Y alloy (wherein Y is an alkali metal, an alkali earth metal, a Group 13 element, a Group 14 element, a transition metal, a rare earth element, or a combination thereof except for Sn), and $MnO_x$ (wherein $0 < x \le 2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. For example, the oxide of the metal/metalloid alloyable with lithium may be a lithium titanium oxide, a vanadium oxide, a lithium vanadium oxide, $SnO_2$, and $SiO_x$ (wherein $0<x<2$).

For example, the negative electrode may be a lithium metal or lithium metal alloy thin film.

The amounts of the negative active material, the conducting agent, the binder, and the solvent may be those levels that are generally used in the manufacture of lithium secondary batteries in the art.

An electrolyte may be any one of the electrolyte composites according to the above-described embodiment.

For example, the lithium secondary battery may further include a separator and/or a lithium salt-containing non-aqueous electrolyte that are in common use in lithium secondary batteries in the art, in addition to the electrolyte composite according to any of the above-described embodiments.

The separator may be an insulating thin film having high ion permeability and high mechanical strength. The separator may have a pore diameter in a range of about 0.01 μm to about 10 μm, and a thickness in a range of about 5 μm to about 20 μm. Examples of the separator are olefin polymers, such as polypropylene, and sheets or non-woven fabric made of glass fiber or polyethylene. When the electrolyte of the lithium battery is a solid polymer electrolyte, the solid polymer electrolyte may also serve as a separator.

The separator may be a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, y-butyrolactone, dioxolane, 4-methyldioxolane, N,N-dimethyl formamide, N,N-dimethyl acetamide, N,N-dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

To improve charge-discharge characteristics and resistance to flame, pyridine, triethylphosphate, triethanolamine, cyclic ether, ethylene diamine, n-glyme, hexamethyl phosphoramide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, or aluminum trichloride may be added to the non-aqueous electrolyte. For example, to provide nonflammable characteristics, a halogen-containing solvent such as carbon tetrachloride, ethylene trifluoride, or the like may be further added to the non-aqueous electrolyte, if needed.

In an exemplary embodiment, the lithium secondary battery may have improved capacity and improved lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

The substituents used in the formulae of the present specification may be defined as follows.

The term "alkyl" as used herein refers to a completely saturated branched or unbranched (or straight-chained or linear) hydrocarbon group.

Non-limiting examples of the "alkyl" group are methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group (—OH), a nitro group (—$NO_2$), a cyano group (—CN), an amino group (—$NH_2$), an amidino group (—C(=NH)$NH_2$), a hydrazine group (—NHNH$_2$), a hydrazone group (—C=N—$NH_2$), a carboxyl group (—$CO_2H$) or a salt thereof, a sulfonyl group (—$SO_2H$), a sulfamoyl group (—S(O)$_2NH_2$), a sulfonic acid group (—$SO_3H$) or a salt thereof, a phosphoric acid group (—P(O)(OH)$_2$) or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group. When a group containing a specified number of carbon atoms is substituted with any of the substituents listed above, the number of carbon atoms in the resulting "substituted" group is the number of atoms contained in the base group plus the number of carbon atoms (if any) contained in the substituent. For example, the "substituted C1-C30 alkyl" may refer to a C1-C30 alkyl group substituted with C6-20 aryl group, in which the total number of carbon atoms may be C7 to C50.

The term "halogen atom" as used herein indicates fluorine, bromine, chloride, or iodine.

The term "alkenyl" group as used herein indicates a branched or unbranched hydrocarbon with at least one carbon-carbon double bond. Non-limiting examples of the alkenyl group are vinyl, butenyl, isopropenyl, and isobutenyl. At least one hydrogen atom in the alkenyl group may be substituted with any of the substituents for the alkyl group as described above.

The term "alkynyl" as used herein indicates a branched or unbranched hydrocarbon with at least one carbon-carbon triple bond. Non-limiting examples of the "alkynyl" group are ethynyl, butynyl, isobutynyl, and isopropynyl. At least one hydrogen atom of the "alkynyl" group may be substituted with any of the substituents for the alkyl group as described above.

The term "aryl" as used herein is construed as including a group with an aromatic ring fused to at least one carbocyclic group cycloalkyl ring. Non-limiting examples of the "aryl" group are phenyl, naphthyl, and tetrahydronaphthyl. At least one hydrogen atom of the "aryl" group may be substituted with any of the substituents for the alkyl group as described above.

The term "heteroaryl" group as used herein indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms.

Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyrid-2-yl, pyrid-3-yl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" as used herein indicates a heteroaromatic ring fused to at least one of an aryl group, a cycloaliphatic group, or a heterocyclic group.

The term "carbocyclic" group as used herein indicates a saturated or partially unsaturated non-aromatic monocyclic, bicyclic, or tricyclic hydrocarbon group.

Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon is adamantyl.

The term "heterocyclic" group as used herein indicates a C5-20 cyclic hydrocarbon group, for example, C5-C10 cyclic hydrocarbon group, including at least one hetero atom. For example, the at least one hetero atom is selected from S, N, O, and B.

As used herein, the terms "alkoxy", "aryloxy", and "heteroaryloxy" indicate alkyl, aryl, and heteroaryl, respectively, each bound to oxygen atom.

Thereinafter, one or more embodiments of the present disclosure will be described in detail with reference to the following examples. However, these examples are not intended to limit the scope of one or more embodiments of the present disclosure.

Example 1: Preparation of Electrolyte

A polystyrene-b-polyisoprene-polystyrene block copolymer was added to anhydrous tetrahydrofuran (THF) to obtain a mixture including a 5 percent by weight (wt %) block copolymer. The block copolymer included a polystyrene unit, a polyisoprene unit, and a polystyrene unit in a mixed ratio of about 11:78:11 by weight and had a weight average molecular weight of about 100,000 Daltons.

Lithium bis(fluorosulfonyl) imide (LiFSI, $LiN(SO_2F)_2$) and $Li_{1.4}Al_{0.4}Ge_{0.2}Ti_{1.4}(PO_4)_3$ (LAGTP) were added to the mixture including the block copolymer to obtain an electrolyte composition. The amount of LiFSI was about 30 parts by weight based on 100 parts by weight of the block copolymer and the amount of LAGTP was about 5 parts by weight based on 100 parts by weight of the block copolymer.

After the electrolyte composition was cast on a substrate, THF in the resulting product was slowly evaporated at a temperature of about 25° C. for about 24 hours in an argon glove box. Then, the resulting product was dried under vacuum at a temperature of about 40° C. for about 24 hours, thereby preparing an electrolyte in a form of a membrane. Here, the electrolyte had a thickness of about 5 micrometers (μm).

Comparative Example 1: Preparation of Electrolyte

An electrolyte in a form of a membrane was prepared in the same manner as in Example 1, except that the mixture including the block copolymer excluded LAGTP but included LiFSI only.

Manufacturing Example 1: Preparation of Lithium Secondary Battery

A coating of the electrolyte composition of Example 1 having a thickness of about 5 μm was applied to a lithium metal thin film (having a thickness of about 20 μm) by using a doctor blade. Then, the resulting product was dried at a temperature of about 25° C. and thermally treated under vacuum at a temperature of about 40° C., so as to manufacture a lithium metal negative electrode including an electrolyte coated thereon.

Separately, $LiCoO_2$, a conducting agent (Super-P, available from Timcal Ltd.), polyvinylidene fluoride (PVdF), and N-pyrrolidone (NMP) were mixed together to obtain a positive electrode composition. Here, a mixed weight ratio of $LiCoO_2$, the conducting agent, and PVdF in the positive electrode composition was about 97:1.5:1.

A coating of the positive electrode composition was applied to an aluminum foil (having a thickness of about 15 μm). The resulting product was dried at a temperature of about 25° C., and then was dried under vacuum at a temperature of about 110° C., so as to manufacture a positive electrode.

The positive electrode was assembled with the lithium metal negative electrode (having a thickness of about 20 μm) in a way that the electrolyte coated on the negative electrode was disposed between the positive electrode and the lithium metal negative electrode, thereby manufacturing a lithium secondary battery (i.e., a coin cell). Then, a polyethylene/polypropylene separator was disposed between the positive electrode and the electrolyte, and a liquid electrolyte was added thereto. The liquid electrolyte used herein was obtained by dissolving 1.3 molar (M) $LiPF_6$ in a mixed solvent of diethyl carbonate (DEC) and fluoroethylene carbonate (FEC) having a volume ratio of about 6:4.

Comparative Manufacturing Example 1:
Preparation of Lithium Secondary Battery

A lithium secondary battery was manufactured in the same manner as in Manufacturing Example 1, except that the electrolyte composition of Comparative Example 1 was used instead of the electrolyte composition of Example 1.

Reference Manufacturing Example 1: Preparation of Lithium Secondary Battery $LiCoO_2$, a conducting agent (Super-P, available from Timcal Ltd.), PVdF, and NMP were mixed together to obtain a positive electrode composition. Here, a mixed weight ratio of $LiCoO_2$, the conducting agent, and PVdF in the positive electrode composition was about 97:1.5:1.5.

A coating of the positive electrode composition was applied to an aluminum foil (having a thickness of about 15 μm). The resulting product was dried at a temperature of about 25° C., and then was dried under vacuum at a temperature of about 110° C., so as to manufacture a positive electrode.

A lithium secondary battery was manufactured using a polypropylene separator (Cellgard 3510) and a liquid electrolyte between the positive electrode and the lithium metal negative electrode (having a thickness of about 20 μm). The liquid electrolyte used herein was obtained by dissolving 1.3 M $LiPF_6$ in a mixed solvent of DEC and FEC having a volume ratio of about 6:4.

Evaluation Example 1: Impedance Measurement

Impedance measurements were performed on the lithium secondary batteries of Manufacturing Example 1 and Comparative Manufacturing Example 1 by using a Solartron 1260A Impedance/Gain-Phase Analyzer at an amplitude of about ±10 milli Volts (mV) in a frequency range of about 0.1 Hertz (Hz) to about 1 mega Hertz (MHz), according to a 2-probe method in which resistance was measured at a temperature of about 25° C.

Figure 5:
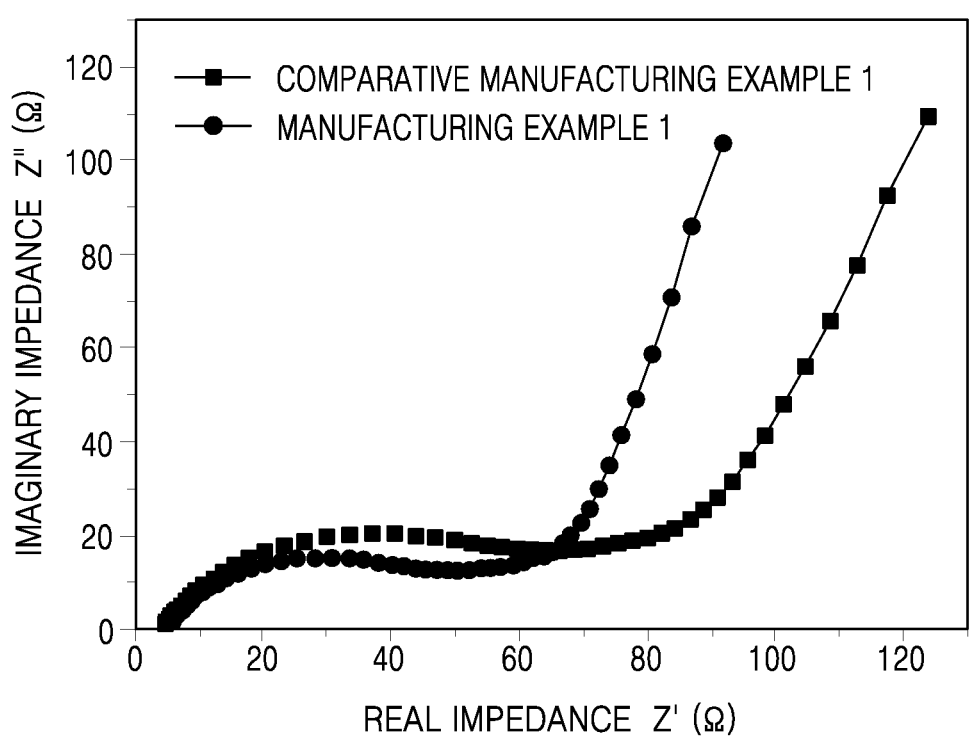
FIG. 5 is a graph of imaginary impedance (Ohm, $\Omega$) versus real impedance (Ohm, $\Omega$) illustrating Nyquist plots obtained from impedance measurements performed on lithium secondary batteries of Manufacturing Example 1 and Comparative Manufacturing Example 1.

The impedance measurements were performed after 24 hours following the manufacture of the lithium secondary batteries of Manufacturing Example 1 and Comparative Manufacturing Example 1, and Nyquist plots obtained from the impedance measurements are shown FIG. 5. In FIG. 5, an interfacial resistance of the electrode is determined by the location and size of a semicircle. A difference between the left side x-intercept and the right side x-intercept of the semicircle denotes an interfacial resistance of the electrode.

As shown in FIG. 5, the lithium secondary battery of Manufacturing Example 1 was found to have a slightly reduced interfacial resistance compared to the lithium secondary battery of Comparative Manufacturing Example 1, due to the inclusion of LAPGT.

Evaluation Example 2: Charge-Discharge Characteristics (Rate Capability)

To confirm changes in high-efficiency characteristics depending on the inclusion of LAGTP, each of the lithium secondary batteries of Manufacturing Example 1, Comparative Manufacturing Example 1, and Reference Manufacturing Example 1 was charged and discharged as follows.

Each of the lithium secondary batteries was charged at a temperature of about 25° C. with a constant current at 0.1 Coulomb (C) rate until a voltage thereof reached 4.30 Volts (V) (with respect to Li), and then, was cut-off in a constant voltage mode at 0.05 C rate while maintaining the voltage of 4.3 V. After the charging, each of the lithium secondary batteries was discharged with a constant current at 0.1 C rate until a voltage thereof reached 2.8 V (with respect to Li). This cycle of charging and discharging was performed 2 more times to complete the formation process.

Each of the lithium secondary batteries after the formation process was charged with a constant current at 0.1 C rate until a voltage thereof reached 4.4 V, and then, discharged with a constant current at 0.1 C until a voltage thereof reached 2.5 V.

From the second cycle onwards, each of the lithium second batteries was charged with a constant current at 0.5 C to a constant voltage of 4.4 V and charged again until a current at 0.05 C, and then, discharged at 0.1 C/0.2 C/0.5 C/1 C rates to a voltage of 2.5 V. A cycle test was performed after charging with a CC of 0.7 C to a voltage of 4.4 V and discharging with a CC of 0.5 C to a voltage of 4.4 V, and discharging with 1 C to 3 V during the $100^{th}$ charging and discharging cycle.

Figure 6A:
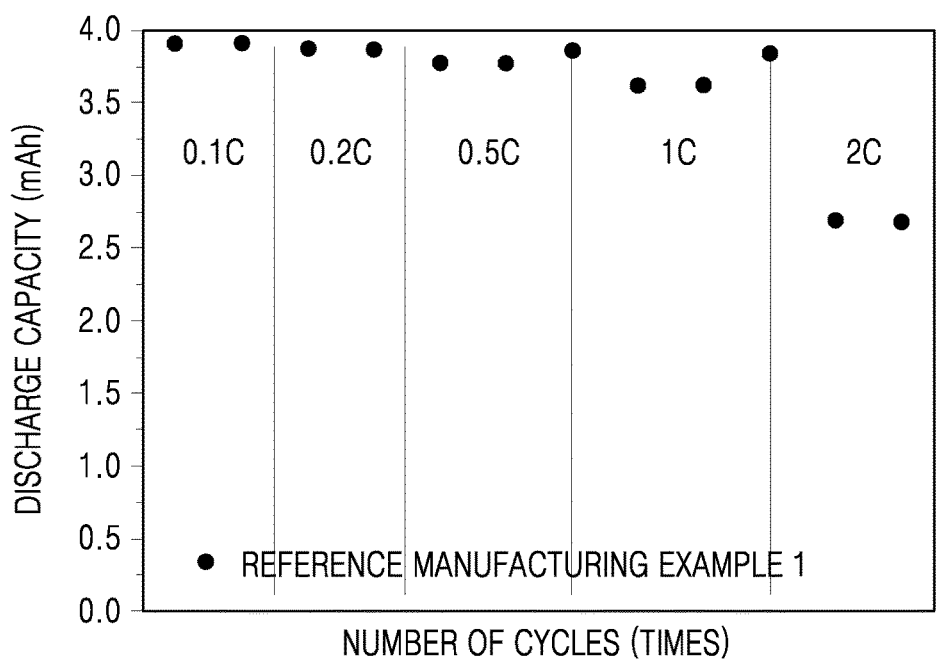
FIG. 6A is a graph of discharge capacity (milli Ampere hours) versus number of cycles illustrating high-efficiency properties of a lithium secondary battery of Reference Manufacturing Example 1.
Figure 6B:
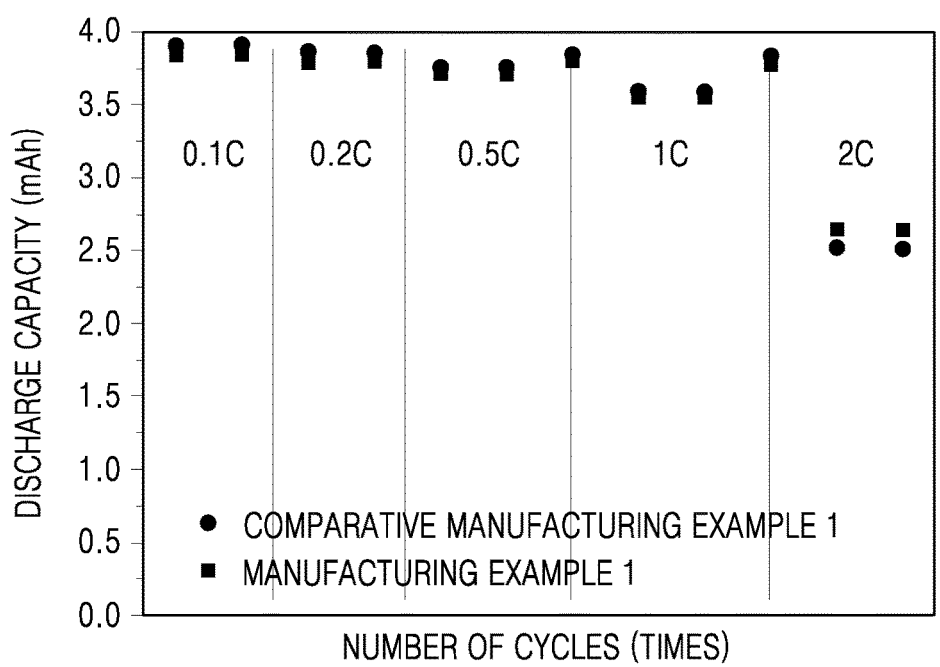
FIG. 6B is a graph of discharge capacity (milli Ampere hours) versus number of cycles illustrating high-efficiency properties of the lithium secondary batteries of Manufacturing Example 1 and Comparative Manufacturing Example 1.

Changes in discharge capacity of the lithium secondary battery of Reference Manufacturing Example 1 are shown in FIG. 6A, and changes in discharge capacity of the lithium secondary batteries of Manufacturing Example 1 and Comparative Manufacturing Example 1 are shown in FIG. 6B.

The rate capability of each of the lithium secondary batteries was calculated using Equation 1.

$$\text{Rate capability} = \{(\text{Discharge capacity after cell discharging with 1.5 C})/(\text{Discharge capacity after cell discharging with 0.2})\} \times 100 \qquad \text{Equation 1}$$

As a result of evaluating the rate capabilities of the lithium secondary batteries, the discharge capacity at 2 C of the lithium secondary battery of Comparative Manufacturing Example 1 was found to be about 65.2% of the discharge capacity thereof at 0.2 C, whereas the discharge capacity at 2 C of the lithium secondary battery of Manufacturing Example 1 was found to be 69.7% of the discharge capacity thereof at 0.2 C. As such, the lithium secondary battery of Manufacturing Example 1 including LAGTP was found to have the improved high-rate characteristics compared to the lithium secondary battery of Comparative Manufacturing Example 1.

In the case of the lithium secondary battery of Reference Manufacturing Example 1 not using the electrolyte membrane, which was formed on the lithium metal thin film using the electrolyte composition of Example 1, the discharge capacity thereof at 2 C was found to be 69.6% of the discharge capacity at 0.2 C. Accordingly, the lithium secondary battery of Manufacturing Example 1 was found to have nearly the same high-rate characteristics as the lithium secondary battery using the lithium metal thin film as the electrolyte.

Evaluation Example 3: Charge-Discharge Characteristics (Discharge Capacity)

Each of the lithium secondary batteries of Manufacturing Example 1 and Comparative Manufacturing Example 1 was charged at a temperature of about 25° C. with a current of 0.1 C rate to a voltage of about 4.30 V (with respect to Li), and with a constant voltage of 4.30 V until a cutoff current of 0.05 C rate, and then, was discharged with a constant current of 0.1 C rate to a voltage of about 2.8 V (with respect to Li) (Formation process, 1$^{st}$ cycle). This cycle of charging and discharging was performed 2 more times to complete the formation process.

Each of the lithium secondary batteries after the formation process was charged at room temperature (25° C.) with a constant current of 0.5 C in a voltage range of about 3.0 V to 4.4 V (with respect to lithium metal), and then, was discharged with a current of 0.2 C until a cutoff voltage of 4.4 V at a constant current of 2.15 milli Amperes (mA).

The above cycle of charging and discharging was repeated 99 more times, i.e., the cycle of charging and discharging was performed 100 times.

The capacity retention rate of each of the lithium secondary batteries was calculated using Equation 2.

Capacity retention rate (%)=(100$^{th}$ cycle discharge capacity/1$^{st}$ cyclic discharge capacity)×100     Equation 2

Figure 7A:
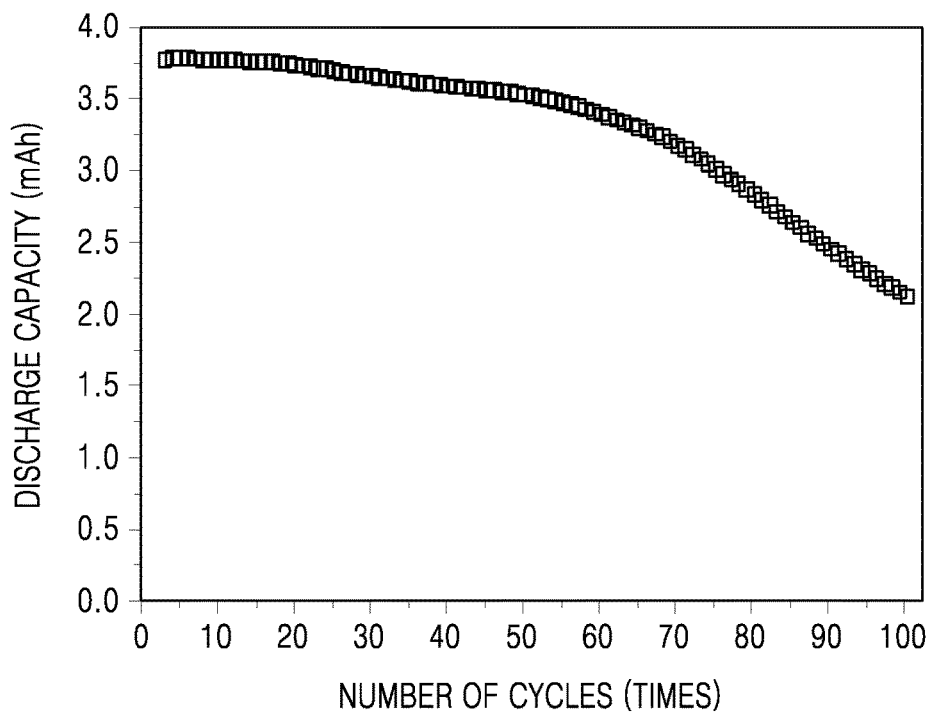
FIGS. 7A and 7B are respective graphs of discharge capacity (milli Ampere hours) versus number of cycles showing changes in discharge capacity with respect to cycle number in the lithium secondary batteries of Comparative Manufacturing Example 1 and Manufacturing Example 1.
Figure 7B:
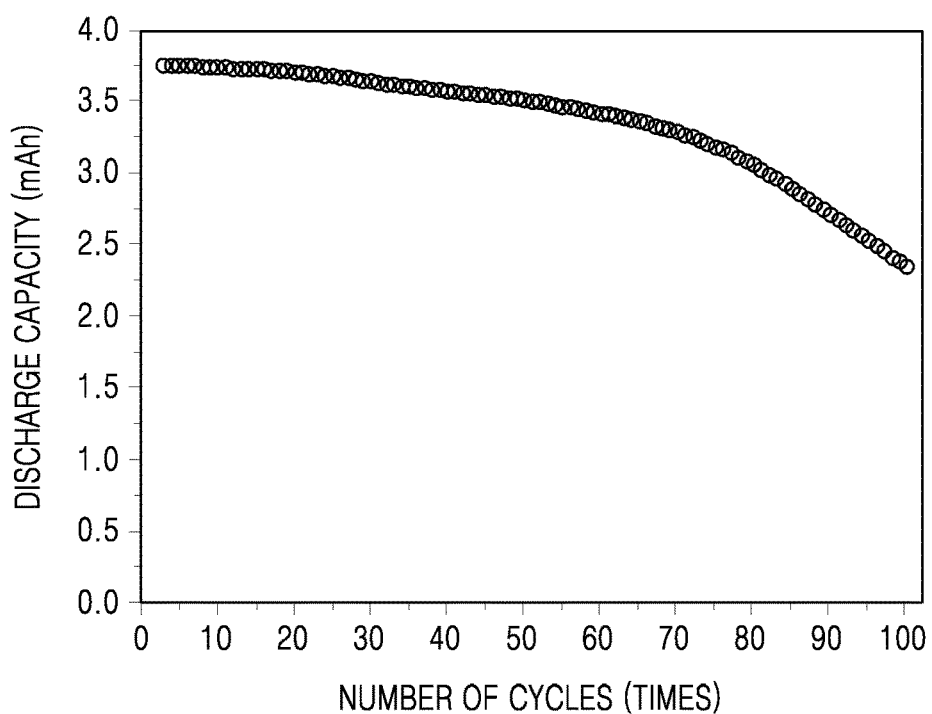

Changes in discharge capacity during the charge/discharge cycles in the lithium secondary batteries of Comparative Manufacturing Example 1 and Manufacturing Example 1 are shown in FIGS. 7A and 7B, respectively, and capacity retention rates of the lithium secondary batteries of Manufacturing Example 1, Comparative Manufacturing Example 1, and Reference Manufacturing Example 1 are compared and shown in Table 1 below.

TABLE 1

|  | 100$^{th}$ cycle capacity retention rate (%) |
|---|---|
| Manufacturing Example 1 | 62.5 |
| Comparative Manufacturing Example 1 | 56.4 |
| Reference Manufacturing Example 1 | 39.8 |

Referring to FIGS. 7A and 7B and Table 1, the lithium secondary battery of Manufacturing Example 1 was found to have a remarkably improved capacity retention rate compared to the lithium secondary battery of Comparative Manufacturing Example 1.

As described above, according to the one or more of the above embodiments of the present inventive concept, an electrolyte composite may have improved stability against liquid electrolyte and improved intensity and ionic conductivity. A lithium secondary battery with improved high-rate and lifespan characteristics may be manufactured using the electrolyte composite that serves as a protection layer for a lithium metal negative electrode.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrolyte composite comprising:
   a first block copolymer; and
   a lithium ion conductor,
   wherein the first block copolymer comprises
   i) a structural domain,
   ii) a rubbery domain, and optionally,
   iii) an ion conductive domain,
   wherein the structural domain comprises a polymer segment comprising a structural repeating unit,
   wherein the rubbery domain comprises a polymer segment comprising a rubbery repeating unit,
   wherein the optional ion conductive domain comprises a polymer segment an ion conductive repeating unit,
   wherein the lithium ion conductor comprises an inorganic compound having ion conductivity of about $1\times10^{-4}$ Siemens per centimeter or greater at a temperature of 25° C.,
   wherein an amount of the lithium ion conductor is in a range of about 10 parts by weight or less based on 100 parts by weight of a total weight of the block copolymer, and
   wherein the lithium ion conductor is in a form of particles within the rubbery domain of the first block copolymer.

2. The electrolyte composite of claim 1,
   wherein the electrolyte composite has a structure in which a plurality of particles of the lithium ion conductor is embedded in a matrix that is formed of the first block copolymer, and
   wherein the matrix has a structure in which the structural domain has a cylindrical phase and is included in a base formed of the rubbery domain, and wherein the lithium ion conductor is embedded in the base.

3. The electrolyte composite of claim 1, wherein a surface of the lithium ion conductor is functionalized with a second block copolymer that is homogeneous or heterogeneous with the first block copolymer.

4. The electrolyte composite of claim 1, wherein the lithium ion conductor comprises at least one selected from $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, $Li_{3-y}PO_{4-x}N_x$, where $0<y<3$ and $0<x<4$, $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, $Li_2S$—$GeS_2$—$Ga_2S_3$, $Li_2O.11Al_2O_3$, $(Na,Li)_{1+x}Ti_{2-x}Al_x(PO_4)_3$, where $0.1\le x\le 0.9$, $Li_{1+x}Hf_{2-x}Al_x(PO_4)_3$, where $0.1\le x\le 0.9$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{3x}La_{2/(3-x)}TiO_3$, where $0<x\le 2$, $Li_{0.3}La_{0.5}TiO_3$, $Na_5MSi_4O_{12}$, where M is Nd, Gd, or Dy, $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$, where $0<x\le 0.8$ and $0\le y\le 1.0$, and M is Nd, Sm, Eu, Gd, Tb, Dy, Ho, Er, Tm, or Yb, $Li_{1+x+y}Q_x(Ge_{1-y}Ti_y)_{2-x}Si_yP_{3-y}O_{12}$, where $0<x\le 0.4$ and $0\le y\le 0.6$, and Q is Al or Ga, $Li_6BaLa_2Ta_2O_{12}$, $Li_{7-y}La_{3-x}A_xZr_{2-y}M_yO_{12}$, where A is Y, Nd, Sm, or Gd, M is Nb or Ta, and $0\le x<3$ and $0\le y<2$, $Li_5La_3Nb_2O_{12}$, $Li_5La_3M_2O_{12}$, where M is Nb or Ta, and $Li_{7+x}Zn_xLa_{3-x}Zr_2O_{12}$, where $0<x<3$.

5. The electrolyte composite of claim 1, wherein the lithium ion conductor comprises a compound represented by Formula 1:

$Li_{1+x}M_xM'_{2-x}(PO_4)_3$     Formula 1 wherein M is at least one element selected from Al, Cr, Ga, Fe, Sc, In, Y, La, and Sc, wherein M' is at least one element selected from Ti, Ge, and Zr, and wherein $0<x\le 7$.

6. The electrolyte composite of claim 1, wherein the lithium ion conductor comprises a compound represented by Formula 2:

$Li_{1+x}Al_xGe_yTi_{2-x-y}(PO_4)_3$     Formula 2 wherein $0<x\le 0.7$ and $0<y\le 0.5$.

7. The electrolyte composite of claim 1, wherein an amount of the lithium ion conductor is in a range of about 0.1 parts by weight to about 10 parts by weight based on 100 parts by weight of a total weight of the block copolymer.

8. The electrolyte composite of claim 1, wherein the polymer segment comprising the structural repeating unit comprises at least one polymer segment selected from polystyrene, hydrogenated polystyrene, polymethacrylate, poly(methyl methacrylate), polyvinyl pyridine, polyvinyl cyclohexane, polyimide, polyamide, polyethylene, polybutylene, polypropylene, poly(4-methyl-1-pentene), poly(butylene terephthalate), poly(isobutyl methacrylate), poly(ethylene terephthalate), polydimethylsiloxane, polyacrylonitrile, polyvinyl cyclohexane, polymaleic acid, poly(maleic anhydride), polyamide, poly(methacrylic acid), poly(tert-butyl vinyl ether), poly(cyclohexyl methacrylate), poly(cyclohexyl vinyl ether), polyvinylidenefluoride, and polydivinylbenzene; or a copolymer of at least two repeating units that constitute said polymers;
  wherein the polymer segment comprising the rubbery repeating unit comprises at least one polymer segment selected from polyisoprene, polybutadiene, polychloroprene, polyisobutylene, and polyurethane; and
  wherein the optional polymer segment comprising the ion conductive repeating unit comprises at least one polymer segment selected from polyethylene oxide, polypropylene oxide, poly(methyl methacrylate), poly(ethyl methacrylate), polydimethylsiloxane, polyacrylic acid, poly(methacrylic acid), poly(methyl acrylate), poly(ethyl acrylate), poly(2-ethylhexyl acrylate), poly(butyl methacrylate), poly(2-ethylhexyl methacrylate), poly(decyl acrylate), poly(ethylene-vinyl acetate), a polyimide, a polyamine, a polyamide, a poly(alkylcarbonate), a polynitrile, a polyphosphazine, a polyolefin, and a polydiene.

9. The electrolyte composite of claim 1, wherein a mixed weight ratio of the polymer segment comprising the structural repeating unit to the polymer segment comprising the rubbery repeating unit and the optional polymer segment comprising the ion conductive repeating unit is in a range of about 1:1 to about 1:4.

10. The electrolyte composite of claim 1, wherein the first block copolymer comprises the structural domain and the rubbery domain.

11. The electrolyte composite of claim 9, wherein the first block copolymer is:
  a block copolymer comprising a polystyrene first block and a polyisoprene second block;
  a block copolymer comprising a polystyrene first block, a polyisoprene second block, and a polystyrene third block;
  a block copolymer comprising a polystyrene first block and a polybutadiene second block; or
  a block copolymer comprising a polystyrene first block, a polybutadiene second block, and a polystyrene third block.

12. The electrolyte composite of claim 11, wherein an amount of the first block and an amount of the third block are each in a range of about 20 parts by weight to about 35 parts by weight based on 100 parts by weight of the total weight of the first block copolymer, and an amount of the second block is in a range of about 65 parts by weight to about 80 parts by weight based on 100 parts by weight of the total weight of the first block copolymer.

13. The electrolyte composite of claim 10, wherein the first block copolymer further comprises a polyethylene oxide block.

14. The electrolyte composite of claim 1, further comprising at least one selected from a liquid electrolyte, a solid electrolyte, a gel electrolyte, a polymer ionic liquid, and a separator;
  wherein the liquid electrolyte comprises at least one selected from an ionic liquid, an organic solvent, an alkali metal salt, or an alkali earth metal salt,
  wherein the ionic liquid comprises:
  at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
  at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$ anions; and
  wherein the alkali metal salt or the alkali earth metal salt comprises at least one lithium salt selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2C_2F_5)_2$, $LiN(SO_2CF_3)_2$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, and $Ca(TFSI)_2$.

15. A negative electrode for a lithium secondary battery, comprising:
  a substrate comprising a lithium metal or a lithium metal alloy; and
  a protective layer disposed on at least one portion of the substrate,
  wherein the protective layer comprises the electrolyte composite of claim 1.

16. A lithium secondary battery comprising:
  a positive electrode;
  a negative electrode; and
  a protective layer disposed between the positive electrode and the negative electrode,
  wherein the protective layer comprises the electrolyte composite of claim 1.

17. The lithium secondary battery of claim 16,
  wherein the negative electrode is a lithium metal or a lithium metal alloy, and
  wherein the lithium secondary battery further comprises a liquid electrolyte disposed between the electrolyte and the positive electrode, wherein the liquid electrolyte comprises at least one selected from an organic solvent, an ionic liquid, an alkali metal salt, and an alkali earth metal salt.

18. The lithium secondary battery of claim 16, wherein the negative electrode is a lithium metal or a lithium metal alloy, and
  wherein the lithium secondary battery further comprises at least one selected from a liquid electrolyte, a gel electrolyte, a polymer electrolyte, and a polymer ionic liquid, disposed between the electrolyte and the positive electrode.

19. An electrolyte composite comprising:
  a first block copolymer; and
  a lithium ion conductor,
  wherein the first block copolymer consists of
  i) a structural domain and
  ii) a rubbery domain,
  wherein the structural domain comprises a polymer segment comprising a structural repeating unit, wherein the rubbery domain comprises a polymer segment comprising a rubbery repeating unit,
wherein the lithium ion conductor comprises an inorganic compound having ion conductivity of about $1\times10^{-4}$ Siemens per centimeter or greater at a temperature of 25° C.,
wherein an amount of the lithium ion conductor is in a range of about 10 parts by weight or less based on 100 parts by weight of a total weight of the block copolymer, and
wherein the lithium ion conductor is in a form of particles within the first block copolymer.

* * * * *